US012655271B2

(12) United States Patent
Matsuda et al.

(10) Patent No.: US 12,655,271 B2
(45) Date of Patent: Jun. 16, 2026

(54) POLYCARBONATE RESIN COMPOSITION AND MOLDED ARTICLES

(71) Applicant: IDEMITSU KOSAN CO., LTD., Tokyo (JP)

(72) Inventors: Misako Matsuda, Tokyo (JP); Kenichi Mitsuhashi, Tokyo (JP); Shuya Nagayama, Tokyo (JP)

(73) Assignee: IDEMITSU KOSAN CO., LTD., Tokyo (JP)

( * ) Notice: Subject to any disclaimer, the term of this patent is extended or adjusted under 35 U.S.C. 154(b) by 299 days.

(21) Appl. No.: 18/285,469

(22) PCT Filed: Mar. 31, 2022

(86) PCT No.: PCT/JP2022/016783
§ 371 (c)(1),
(2) Date: Oct. 3, 2023

(87) PCT Pub. No.: WO2022/215657
PCT Pub. Date: Oct. 13, 2022

(65) Prior Publication Data

US 2024/0199849 A1 Jun. 20, 2024

(30) Foreign Application Priority Data

Apr. 5, 2021 (JP) ................................ 2021-064310

(51) Int. Cl.

| | |
|---|---|
| ***C08K 5/43*** | (2006.01) |
| ***C08J 5/18*** | (2006.01) |
| ***C08K 5/134*** | (2006.01) |
| ***C08K 5/42*** | (2006.01) |
| ***C08K 5/526*** | (2006.01) |
| ***C08K 5/527*** | (2006.01) |
| ***C08L 69/00*** | (2006.01) |

(52) U.S. Cl.
CPC .................................... *C08K 5/43* (2013.01); *C08J 5/18* (2013.01); *C08K 5/1345* (2013.01); *C08K 5/42* (2013.01); *C08K 5/526* (2013.01); *C08K 5/527* (2013.01); *C08L 69/00* (2013.01); *C08J 2369/00* (2013.01); *C08J 2469/00* (2013.01); *C08J 2483/04* (2013.01); *C08K 2201/014* (2013.01); *C08L 2205/025* (2013.01); *C08L 2205/03* (2013.01)

(58) Field of Classification Search
CPC ................................. C08K 5/43; C08L 69/00
See application file for complete search history.

(56) References Cited

U.S. PATENT DOCUMENTS

| | | | | |
|---|---|---|---|---|
| 2003/0022971 A1 | 1/2003 | Boyd et al. | | |
| 2012/0251785 A1 | 10/2012 | Ohira et al. | | |
| 2018/0066134 A1 | 3/2018 | Aoki et al. | | |
| 2022/0056263 A1* | 2/2022 | Torii | ...................... | C08K 5/527 |

FOREIGN PATENT DOCUMENTS

| | | | | |
|---|---|---|---|---|
| CN | 107429052 A | 12/2017 | | |
| JP | 2004-521166 A | 7/2004 | | |
| JP | 2012-131842 A | 7/2012 | | |
| JP | 2014-153536 A | 8/2014 | | |
| JP | 2014-156536 A | 8/2014 | | |
| JP | 2016-117811 A | 6/2016 | | |
| JP | 2018-154662 A | 10/2018 | | |
| JP | 2018-170105 A | 11/2018 | | |
| JP | 2019-203081 A | 11/2019 | | |
| WO | WO-2016/039370 A1 | 3/2016 | | |
| WO | WO-2020054742 A1 * | 3/2020 | .............. | C08L 71/02 |

OTHER PUBLICATIONS

International Search Report issued in connection with PCT Appl. No. PCT/JP2022/016783 dated Jun. 21, 2022.
Written Opinion of the International Searching Authority issued in connection with PCT Appl. No. PCT/JP2022/016783 dated Jun. 21, 2022.
Office Action issued in corresponding Japanese Patent Application No. 2023-513000 dated Aug. 5, 2025.

(Continued)

*Primary Examiner* — Zachary M Davis
(74) *Attorney, Agent, or Firm* — Foley & Lardner LLP

(57) ABSTRACT

The present invention relates to a polycarbonate-based resin composition including: a polycarbonate-based resin (A); and a perfluoroalkylsulfonimide (B) represented by the following formula (1), wherein the polycarbonate-based resin (A) has a branching ratio of 0.30 mol % or more and 3.0 mol % or less, which is calculated from the expression "(number of moles of structural unit derived from branching agent)/(number of moles of structural unit derived from dihydric phenol+number of moles of structural unit derived from branching agent+number of moles of terminal unit)×100," and wherein a content of the perfluoroalkylsulfonimide (B) is 0.05 part by mass or more and 2.0 parts by mass or less with respect to 100 parts by mass of the polycarbonate-based resin (A).

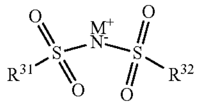

(1)

13 Claims, No Drawings

(56) References Cited

OTHER PUBLICATIONS

European Extended Search Report issued in corresponding European Patent Application No. 22784640.9 dated Mar. 13, 2025.
Office Action issued in corresponding Taiwanese Patent Application No. 111112781 dated Sep. 30, 2025.
Office Action issued in corresponding Japanese Patent Application No. 2023-513000 dated Mar. 3, 2026.
Office Action issued in corresponding Chinese Patent Application No. 202280026749.6 dated Mar. 19, 2026.
Office Action issued in corresponding Taiwanese Patent Application No. 11112781 on Apr. 28, 2026.

* cited by examiner

POLYCARBONATE RESIN COMPOSITION AND MOLDED ARTICLES

CROSS-REFERENCE TO RELATED APPLICATIONS

The present application claims priority under 35 U.S.C. § 371 to International Patent Application No. PCT/JP2022/016783, filed Mar. 31, 2022, which claims priority to and the benefit of Japanese Patent Application No. 2021-064310, filed on Apr. 5, 2021. The contents of this application is hereby incorporated by reference in its entirety.

TECHNICAL FIELD

The present invention relates to a polycarbonate-based resin composition and a molded article.

BACKGROUND ART

A polycarbonate resin is excellent in, for example, optical transparency, mechanical characteristic, thermal characteristic, electrical characteristic, and weatherability. Through utilization of those characteristics, the polycarbonate resin has been used in various optical molded articles, for example, lighting equipment covers each made of a resin, such as a lighting cover and a display cover, and a lens, and transparent parts for products in an electrical and electronic field. Those molded articles have each been required to have, for example, flame retardancy, high optical transparency (a high total light transmittance), and a high color tone (a low yellow tinge or low opacity).

A technology concerning a flame-retardant polycarbonate-based resin composition for such molded article is, for example, a technology as described in each of Patent Documents 1 to 3.

In Patent Document 1, there is a description that the following polycarbonate resin composition is excellent in flame retardancy by which a combustion rate after its ignition is suppressed, and hence the composition can reduce the maximum heat generation rate at the time of its combustion: the composition contains a polycarbonate resin and a glass filler; the glass filler has an average long diameter of 1,000 μm or less; and the total amount of an organometallic salt of a sulfonic acid and an organometallic salt of a sulfonamide is 1 mass % or less with respect to the total amount of the polycarbonate resin and the glass filler.

In Patent Document 2, there is a description that a polycarbonate resin composition, which is characterized by containing, with respect to 100 parts by mass of (A) a polycarbonate resin, 0.05 part by mass to 3 parts by mass of (B) a light diffuser, and 0.01 part by mass to 0.3 part by mass of (C) a trifluoromethanesulfonic acid alkali metal salt, is excellent in light transmittance and dispersion degree, and has a high degree of flame retardancy.

In Patent Document 3, there is a description that a flame-retardant composition, which contains a carbonate polymer and an additive metal salt containing an anion selected from the group consisting of: (a) a highly fluorinated methide; (b) a highly fluorinated imide; (c) a highly fluorinated amide; and a combination of two or more thereof, provides flame retardancy even when the amount of an additive is at a relatively low level, and the composition enables a wider variety of means for processing an additive composition and can have a high transparency.

CITATION LIST

Patent Document

Patent Document 1: JP 2018-170105 A
Patent Document 2: JP 2019-203081 A
Patent Document 3: JP 2004-521166 A

SUMMARY OF INVENTION

Technical Problem

An investigation made by the inventors of the present invention has revealed that the polycarbonate-based resin compositions as described in Patent Documents 1 to 3 are each susceptible to improvement in terms of thin-wall flame retardancy, that is, flame retardancy when the thickness of a molded article to be obtained is small. Further, a yellow tinge or opacity has occurred in each of molded articles formed of those polycarbonate-based resin compositions to deteriorate its color tone in some cases.

The present invention has been made in view of the above-mentioned circumstances, and an object of the present invention is to provide a polycarbonate-based resin composition that can provide a molded article, which is suppressed from causing a yellow tinge and opacity, and which is improved in thin-wall flame retardancy and optical transparency.

Solution to Problem

The inventors of the present invention have found that a molded article formed of a polycarbonate-based resin composition including a polycarbonate-based resin (A) having a branching ratio in a specific range and a specific perfluoroalkylsulfonimide (B) at a specific ratio is suppressed from causing a yellow tinge and opacity, and is improved in thin-wall flame retardancy and optical transparency.

That is, according to the present invention, there are provided the following polycarbonate-based resin composition and molded article.

[1] A polycarbonate-based resin composition, comprising: a polycarbonate-based resin (A); and a perfluoroalkylsulfonimide (B) represented by the following formula (1), wherein the polycarbonate-based resin (A) has a branching ratio of 0.30 mol % or more and 3.0 mol % or less, which is calculated from the expression "(number of moles of structural unit derived from branching agent)/(number of moles of structural unit derived from dihydric phenol+number of moles of structural unit derived from branching agent+number of moles of terminal unit)×100," and wherein a content of the perfluoroalkylsulfonimide (B) is 0.05 part by mass or more and 2.0 parts by mass or less with respect to 100 parts by mass of the polycarbonate-based resin (A):

(1)

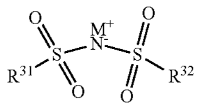

wherein in the formula (1), $R^{31}$ represents a perfluoroalkyl group having 1 to 3 carbon atoms, $R^{32}$ represents a perfluoroalkyl group having 1 to 4 carbon atoms, and $M^+$ represents at least one kind of monovalent cation selected from the group consisting of: a lithium ion; a sodium ion; and a potassium ion.

[2] The polycarbonate-based resin composition according to the above-mentioned item [1], wherein the polycarbonate-based resin (A) contains a branched polycarbonate-based resin (A-1) and an aromatic polycarbonate-based resin (A-2) except the branched polycarbonate-based resin (A-1).

[3] The polycarbonate-based resin composition according to the above-mentioned item [2], wherein the branched polycarbonate-based resin (A-1) has a repeating unit represented by the following formula (I) and a branched structure represented by the following formula (II):

(I)

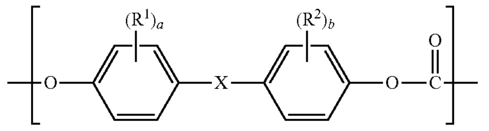

wherein in the formula (I), $R^1$ and $R^2$ each independently represent a halogen atom or a group selected from the group consisting of: an alkyl group having 1 to 18 carbon atoms; an alkoxy group having 1 to 18 carbon atoms; a cycloalkyl group having 6 to 20 carbon atoms; a cycloalkoxy group having 6 to 20 carbon atoms; an alkenyl group having 2 to 10 carbon atoms; an aryl group having 6 to 14 carbon atoms; an aryloxy group having 6 to 14 carbon atoms; an aralkyl group having 7 to 20 carbon atoms; an aralkyloxy group having 7 to 20 carbon atoms; a nitro group; an aldehyde group; a cyano group; and a carboxyl group, X represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, an aralkyl group having 7 to 20 carbon atoms, —S—, —SO—, $—SO_2—$, —O—, or —CO—, and "a" and "b" each independently represent an integer of from 0 to 4;

(II)

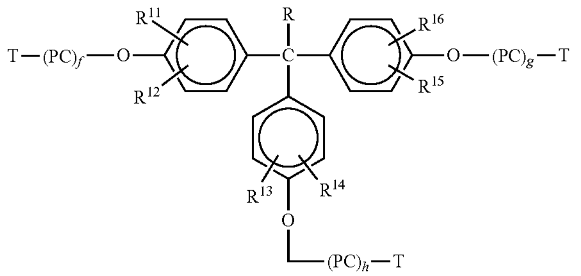

wherein in the formula (II), R represents a hydrogen atom or a group selected from the group consisting of: an alkyl group having 1 to 5 carbon atoms; a cycloalkyl group having 6 to 20 carbon atoms; a cycloalkoxy group having 6 to 20 carbon atoms; an alkenyl group having 2 to 10 carbon atoms; and an aryl group having 6 to 14 carbon atoms, $R^{11}$ to $R^{16}$ each independently represent a hydrogen atom, an alkyl group having 1 to 5 carbon atoms, or a halogen atom, PC represents a polycarbonate moiety, T represents a terminal group, and "f", "g", and "h" each represent an integer.

[4] The polycarbonate-based resin composition according to any one of the above-mentioned items [1] to [3], wherein the polycarbonate-based resin (A) has a viscosity-average molecular weight of 10,000 or more and 50,000 or less.

[5] The polycarbonate-based resin composition according to any one of the above-mentioned items [1] to [4], further comprising an antioxidant (C), wherein a content of the antioxidant (C) is 0.03 part by mass or more and 0.50 part by mass or less with respect to 100 parts by mass of the polycarbonate-based resin (A)

[6] The polycarbonate-based resin composition according to the above-mentioned item [5], wherein the antioxidant (C) contains at least one kind selected from a phosphorus-based antioxidant and a phenol-based antioxidant.

[7] The polycarbonate-based resin composition according to any one of the above-mentioned items [1] to [6], further comprising a release agent (D), wherein a content of the release agent (D) is 0.01 part by mass or more and 5.0 parts by mass or less with respect to 100 parts by mass of the polycarbonate-based resin (A)

[8] The polycarbonate-based resin composition according to any one of the above-mentioned items [1] to [7], further comprising a silicone compound (E), wherein a content of the silicone compound (E) is 0.01 part by mass or more and 5.0 parts by mass or less with respect to 100 parts by mass of the polycarbonate-based resin (A).

[9] The polycarbonate-based resin composition according to any one of the above-mentioned items [1] to [8], wherein the polycarbonate-based resin composition comprises a perfluoroalkane sulfonic acid metal salt and an aromatic ring-containing sulfonic acid metal salt at a total content of less than 0.05 part by mass with respect to 100 parts by mass of the polycarbonate-based resin (A).

[10] The polycarbonate-based resin composition according to any one of the above-mentioned items [1] to [9], wherein a 5-millimeter thick plate, which is obtained by subjecting the polycarbonate-based resin composition to injection molding under conditions of a cylinder temperature of 280° C., a mold temperature of 80° C., and a cycle time of 53 seconds, has a total light transmittance of 80% or more.

[11] The polycarbonate-based resin composition according to any one of the above-mentioned items [1] to [10], wherein a 5-millimeter thick plate, which is obtained by subjecting the polycarbonate-based resin composition to injection molding under conditions of a cylinder temperature of 280° C., a mold temperature of 80° C., and a cycle time of 53 seconds, has a haze of 4.0% or less.

[12] The polycarbonate-based resin composition according to any one of the above-mentioned items [1] to [11], wherein a 1.5-millimeter thick plate, which is obtained by subjecting the polycarbonate-based resin composition to injection molding under conditions of a cylinder temperature of 280° C., a mold temperature of 80° C., and a cycle time of 18 seconds, has a flame retardancy of V-0 under a UL94 standard.

[13] The polycarbonate-based resin composition according to any one of the above-mentioned items [1] to [12], wherein a 5-millimeter thick plate, which is obtained by subjecting the polycarbonate-based resin composition to injection molding under conditions of a cylinder temperature of 280° C., a mold temperature of 80° C., and a cycle time of 53 seconds, has a YI value of 6.0 or less.

[14] The polycarbonate-based resin composition according to any one of the above-mentioned items [1] to [13], wherein the polycarbonate-based resin composition is used for an optically transparent molded article.

[15] A molded article, comprising the polycarbonate-based resin composition of any one of the above-mentioned items [1] to

Advantageous Effects of Invention

According to the present invention, the polycarbonate-based resin composition that can provide the molded article, which is suppressed from causing a yellow tinge and opacity, and which is improved in thin-wall flame retardancy and optical transparency, can be provided.

DESCRIPTION OF EMBODIMENTS

1. Polycarbonate-Based Resin Composition

A polycarbonate-based resin composition of the present invention includes: a polycarbonate-based resin (A); and a perfluoroalkylsulfonimide (B) represented by the following formula (1). In addition, the polycarbonate-based resin (A) has a branching ratio of 0.30 mol % or more and 3.0 mol % or less, which is calculated from the expression "(number of moles of structural unit derived from branching agent)/(number of moles of structural unit derived from dihydric phenol+number of moles of structural unit derived from branching agent+number of moles of terminal unit)×100," and a content of the perfluoroalkylsulfonimide (B) is 0.05 part by mass or more and 2.0 parts by mass or less with respect to 100 parts by mass of the polycarbonate-based resin (A):

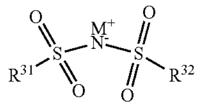

(1)

wherein in the formula (1), $R^{31}$ represents a perfluoroalkyl group having 1 to 3 carbon atoms, $R^{32}$ represents a perfluoroalkyl group having 1 to 4 carbon atoms, and $M^+$ represents at least one kind of monovalent cation selected from the group consisting of: a lithium ion; a sodium ion; and a potassium ion.

According to the polycarbonate-based resin composition of the present invention, a molded article, which is suppressed from causing a yellow tinge and opacity, and which is improved in thin-wall flame retardancy and optical transparency, can be obtained.

The polycarbonate-based resin composition, and a molded article thereof, of the present invention are described in detail below. In this description, a specification considered to be preferred may be arbitrarily adopted, and it can be said that a combination of preferred specifications is more preferred. The term "XX to YY" as used herein means "XX or more and YY or less."

[Polycarbonate-Based Resin (A)]

The polycarbonate-based resin composition of the present invention includes the polycarbonate-based resin (A) having a branching ratio of 0.30 mol % or more and 3.0 mol % or less.

The polycarbonate-based resin (A) having such branching ratio preferably contains a branched polycarbonate-based resin (A-1), and more preferably contains the branched polycarbonate-based resin (A-1) and an aromatic polycarbonate-based resin (A-2) except the branched polycarbonate-based resin (A-1).

<Branched Polycarbonate-Based Resin (A-1)>

The branched polycarbonate-based resin (A-1) is not particularly limited as long as the branched polycarbonate-based resin (A-1) is a polycarbonate-based resin having a branched structure. An example thereof may be a polycarbonate-based resin having a repeating unit represented by the following formula (I) and a branched structure represented by the following formula (II):

(I)

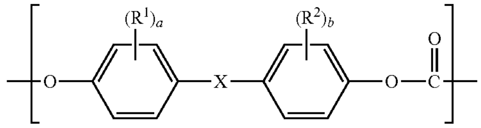

wherein in the formula (I), $R^1$ and $R^2$ each independently represent a halogen atom or a group selected from the group consisting of: an alkyl group having 1 to 18 carbon atoms; an alkoxy group having 1 to 18 carbon atoms; a cycloalkyl group having 6 to 20 carbon atoms; a cycloalkoxy group having 6 to 20 carbon atoms; an alkenyl group having 2 to 10 carbon atoms; an aryl group having 6 to 14 carbon atoms; an aryloxy group having 6 to 14 carbon atoms; an aralkyl group having 7 to 20 carbon atoms; an aralkyloxy group having 7 to 20 carbon atoms; a nitro group; an aldehyde group; a cyano group; and a carboxyl group, X represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, an aralkyl group having 7 to 20 carbon atoms, —S—, —SO—, —$SO_2$—, —O—, or —CO—, and "a" and "b" each independently represent an integer of from 0 to 4;

(II)

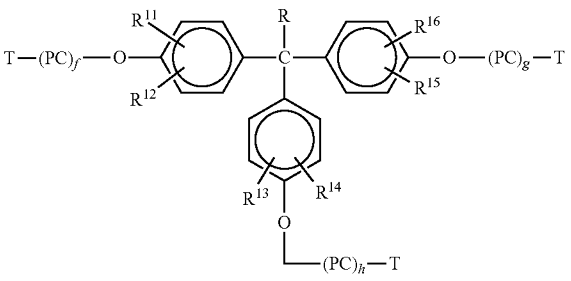

wherein in the formula (II), R represents a hydrogen atom or a group selected from the group consisting of: an alkyl group having 1 to 5 carbon atoms; a cycloalkyl group having 6 to 20 carbon atoms; a cycloalkoxy group having 6 to 20 carbon atoms; an alkenyl group having 2 to 10 carbon atoms; and an aryl group having 6 to 14 carbon atoms, $R^{11}$ to $R^{16}$ each independently represent a hydrogen atom, an alkyl group having 1 to 5 carbon atoms, or a halogen atom, PC represents a polycarbonate moiety, T represents a terminal group, and "f", "g", and "h" each represent an integer.

In the formula (I), the halogen atom that $R^1$ and $R^2$ each independently represent include a fluorine atom, a chlorine atom, a bromine atom, and an iodine atom.

Examples of the alkyl group that $R^1$ and $R^2$ each independently represent include a methyl group, an ethyl group, a n-propyl group, an isopropyl group, various butyl groups (the term "various" means that a linear group and all kinds of branched groups are included, and in this description, the same holds true for the following), various pentyl groups, and various hexyl groups. Examples of the alkoxy group that $R^1$ and $R^2$ each independently represent include alkoxy groups having the above-mentioned alkyl groups as alkyl group moieties.

Examples of the alkylene group represented by X include a methylene group, an ethylene group, a trimethylene group, a tetramethylene group, and a hexamethylene group. Among them, an alkylene group having 1 to 5 carbon atoms is preferred. Examples of the alkylidene group represented by X include an ethylidene group and an isopropylidene group. Examples of the cycloalkylene group represented by X include a cyclopentanediyl group, a cyclohexanediyl group, and a cyclooctanediyl group. Among them, a cycloalkylene group having 5 to 10 carbon atoms is preferred. Examples of the cycloalkylidene group represented by X include a cyclohexylidene group, a 3,5,5-trimethylcyclohexylidene group, and a 2-adamantylidene group. Among them, a cycloalkylidene group having 5 to 10 carbon atoms is preferred, and a cycloalkylidene group having 5 to 8 carbon atoms is more preferred.

"a" and "b" each independently represent an integer of from 0 to 4, preferably from 0 to 2, more preferably 0 or 1. Among them, a repeating unit in which "a" and "b" each represent 0, and X represents a single bond or an alkylene group having 1 to 8 carbon atoms, or a repeating unit in which "a" and "b" each represent 0, and X represents an alkylidene group having 3 carbon atoms, in particular, an isopropylidene group is suitable.

Next, the branched structure represented by the formula (II) is described.

In the formula (II), examples of the alkyl group having 1 to 5 carbon atoms that is represented by R may include a methyl group, an ethyl group, a n-propyl group, a n-butyl group, and a n-pentyl group. Examples of the alkyl group having 1 to 5 carbon atoms that is represented by any one of $R^{11}$ to $R^{16}$ may include a methyl group, an ethyl group, a n-propyl group, a n-butyl group, and a n-pentyl group. Examples of the halogen atom may include a chlorine atom, a bromine atom, and a fluorine atom.

The polycarbonate moiety represented by PC in the formula (II) has a repeating unit represented by the above-mentioned formula (I). The polycarbonate moiety represented by PC has, for example, a repeating unit derived from bisphenol A that is represented by the following formula (III).

(III)

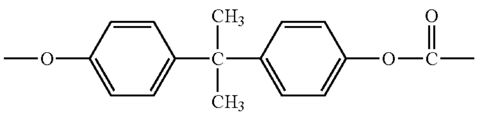

In each of the $(PC)_f$, $(PC)_g$, and $(PC)_h$ moieties in the formula (II), the carbon atom of an —O—C(=O)— group in the polycarbonate moiety at one terminal is bonded to an adjacent oxygen atom in the formula (II), and an oxygen atom in the polycarbonate moiety at the other terminal is bonded to an adjacent terminal group.

The terminal group (also referred to as "terminal unit") represented by T is derived from a terminal stopper.

A branching agent and a raw material dihydric phenol to be used at the time of the production of the branched polycarbonate-based resin (A-1) are described later.

It is preferred that the branched polycarbonate-based resin (A-1) have the branched structure represented by the formula (II), and have a branching ratio of 0.30 mol % or more and 3.0 mol % or less. When the branching ratio of the branched polycarbonate-based resin (A-1) falls within the range, the flame retardancy of the polycarbonate-based resin composition of the present invention can be further improved, and the polycarbonate is easy to produce because gelation hardly occurs during its polymerization. The branching ratio of the branched polycarbonate-based resin (A-1) means the ratio of the number of moles of a structural unit derived from the branching agent to the total number of moles of a structural unit derived from the dihydric phenol and the structural unit derived from the branching agent, the dihydric phenol and the branching agent being used in the production of the branched polycarbonate-based resin (A-1), and a terminal unit (number of moles of structural unit derived from branching agent/total number of moles of (structural unit derived from dihydric phenol+structural unit derived from branching agent+terminal unit)×100 (represented in the unit of mol %)). The branching ratio may be actually measured by $^1$H-NMR measurement.

When the branching agent to be described later is added at 0.30 mol % or more and 3.0 mol % or less with respect to the total number of moles of the dihydric phenol compound, the branching agent, and a terminal stopper added as required, which are raw materials for the branched polycarbonate-based resin (A-1), at the time of the production of the polycarbonate-based resin, a branched polycarbonate-based resin having a branching ratio in the above-mentioned range can be obtained.

The branching ratio of the branched polycarbonate-based resin (A-1) is preferably 0.35 mol % or more, more preferably 0.40 mol % or more, still more preferably 0.43 mol % or more, still more preferably 0.45 mol % or more from the viewpoint of further improving the thin-wall flame retardancy of a molded article to be obtained. The branching ratio is preferably 2.5 mol % or less, more preferably 2.0 mol % or less, still more preferably 1.5 mol % or less, still more preferably 1.0 mol % or less from the viewpoint of obtaining satisfactory thin-wall flame retardancy, satisfactory optical transparency, a satisfactory mechanical characteristic, satisfactory moldability, and satisfactory fluidity. The branched structure may be derived from a single branching agent, or may be derived from two or more kinds of branching agents. In particular, the branched structure represented by the formula (II) is more preferably a structure derived from 1,1,1-tris(4-hydroxyphenyl)ethane in which R represents a methyl group and $R^{11}$ to $R^{16}$ each represent a hydrogen atom.

The branched polycarbonate-based resin (A-1) has a viscosity-average molecular weight (Mv) of preferably from 10,000 to 50,000, more preferably from 15,000 to 30,000, still more preferably from 17,000 to 28,000. The viscosity-average molecular weight may be adjusted by using, for example, a molecular weight modifier (terminal stopper), or in accordance with a reaction condition. When the viscosity-average molecular weight of the branched polycarbonate-based resin (A-1) falls within the ranges, there can be obtained a polycarbonate-based resin composition, which can be further improved in balance among flame retardancy, optical transparency, and mechanical characteristic, and is more excellent in moldability.

The viscosity-average molecular weight (Mv) is a value calculated from the following Schnell's equation by measuring the limiting viscosity [η] of a methylene chloride solution (unit of concentration: g/L) at 20° C.

$$[\eta]=1.23\times10^{-5}\times Mv^{0.83}$$

<Aromatic Polycarbonate-Based Resin (A-2)>

The aromatic polycarbonate-based resin (A-2) is an unbranched polycarbonate-based resin except the branched polycarbonate-based resin (A-1), and preferably has a repeating unit represented by the following formula (IV):

(IV)

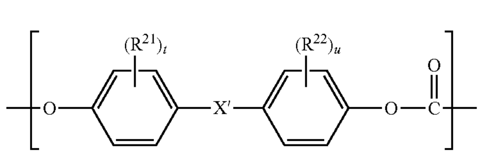

wherein in the formula (IV), $R^{21}$ and $R^{22}$ each independently represent a halogen atom or a group selected from the group consisting of: an alkyl group having 1 to 18 carbon atoms; an alkoxy group having 1 to 18 carbon atoms; a cycloalkyl group having 6 to 20 carbon atoms; a cycloalkoxy group having 6 to 20 carbon atoms; an alkenyl group having 2 to 10 carbon atoms; an aryl group having 6 to 14 carbon atoms; an aryloxy group having 6 to 14 carbon atoms; an aralkyl group having 7 to 20 carbon atoms; an aralkyloxy group having 7 to 20 carbon atoms; a nitro group; an aldehyde group; a cyano group; and a carboxyl group, X' represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, an aralkyl group having 7 to 20 carbon atoms, —S—, —SO—, —$SO_2$—, —O—, or —CO—, and "t" and "u" each independently represent an integer of from 0 to 4.

Specific examples of the halogen atom, the alkyl group having 1 to 6 carbon atoms, or the alkoxy group having 1 to 6 carbon atoms that is represented by each of $R^{21}$ and $R^{22}$ in the formula (IV) are the same as those described above for $R^1$ and $R^2$. Specific examples of the alkylene group having 1 to 8 carbon atoms, the alkylidene group having 2 to 8 carbon atoms, the cycloalkylene group having 5 to 15 carbon atoms, or the cycloalkylidene group having 5 to 15 carbon atoms that is represented by X' are the same as those described above for X. "t" and "u" each independently represent an integer of from 0 to 4, preferably from 0 to 2, more preferably 0 or 1.

Among such resins, a resin in which "t" and "u" each represent 0, and X' represents a single bond or an alkylene group having 1 to 8 carbon atoms, or a resin in which "t" and "u" each represent 0, and X' represents an alkylidene group, in particular, an isopropylidene group is suitable. The polycarbonate-based resin of the present invention may include a plurality of kinds of polycarbonate blocks as the aromatic polycarbonate-based resins (A-2).

The aromatic polycarbonate-based resin (A-2) is a resin containing preferably 90 mass % or more, more preferably 90.9 mass % or more, still more preferably 93.3 mass % or more, still more preferably 95 mass % or more, still more preferably 100 mass % of a repeating unit represented by the formula (IV) in which "t" and "u" each represent 0, and X' represents an isopropylidene group.

The viscosity-average molecular weight (Mv) of the aromatic polycarbonate-based resin (A-2) is typically from 10,000 to 50,000, preferably from 13,000 to 35,000, more preferably from 14,000 to 28,000.

The viscosity-average molecular weight (Mv) was calculated from Schnell's equation as with the branched polycarbonate-based resin (A-1).

<Polycarbonate-based Resin (A)>

When the polycarbonate-based resin (A) of the present invention contains, for example, the branched polycarbonate-based resin (A-1) and the aromatic polycarbonate-based resin (A-2) except the branched polycarbonate-based resin (A-1), the content of the branched polycarbonate-based resin (A-1) is preferably 40 mass % or more, more preferably 45 mass % or more, still more preferably 50 mass % or more, and may be 100 mass %. The content of the aromatic polycarbonate-based resin (A-2) is the balance excluding the branched polycarbonate-based resin (A-1).

The branching ratio of the polycarbonate-based resin (A) is 0.30 mol % or more and 3.0 mol % or less. The branching ratio is preferably 0.35 mol % or more, more preferably 0.40 mol % or more, still more preferably 0.43 mol % or more, still more preferably 0.45 mol % or more from the viewpoint of further improving the thin-wall flame retardancy of a molded article to be obtained. The branching ratio is preferably 2.5 mol % or less, more preferably 2.0 mol % or less, still more preferably 1.5 mol % or less, still more preferably 1.0 mol % or less from the viewpoint of obtaining satisfactory thin-wall flame retardancy, satisfactory optical transparency, a satisfactory mechanical characteristic, satisfactory moldability, and satisfactory fluidity.

The branching ratio of the polycarbonate-based resin (A) means the ratio of the number of moles of a structural unit derived from the branching agent to the total number of moles of a structural unit derived from the dihydric phenol, the structural unit derived from the branching agent, the dihydric phenol and the branching agent being used in the production of the branched polycarbonate-based resin (A-1) and the aromatic polycarbonate-based resin (A-2), and a terminal unit (number of moles of structural unit derived from branching agent/total number of moles of (structural unit derived from dihydric phenol+structural unit derived from branching agent+terminal unit)×100 (represented in the unit of mol %)). The branching ratio may be actually measured by $^1$H-NMR measurement.

When two or more kinds of resins are used as the polycarbonate-based resin (A), the branching ratio of the mixture of the two or more kinds of resins is adopted as the branching ratio of the polycarbonate-based resin (A). The viscosity-average molecular weight of the polycarbonate-based resin (A) is preferably from 10,000 to 50,000, more preferably from 13,000 to 35,000, still more preferably from 15,000 to 30,000, still more preferably from 17,000 to 28,000, still more preferably from 20,000 to 25,000. When the viscosity-average molecular weight of the polycarbonate-based resin (A) falls within the ranges, there can be obtained a polycarbonate-based resin composition, which can be further improved in balance among flame retardancy, optical transparency, and a mechanical characteristic, and is more excellent in moldability. The viscosity-average molecular weight is a value calculated from Schnell's equation as with the branched polycarbonate-based resin (A-1).

When two or more kinds of resins are used as the polycarbonate-based resin (A), the viscosity-average molecular weight of the mixture of the two or more kinds of resins is adopted as the viscosity-average molecular weight of the polycarbonate-based resin (A).

<Method of Producing Polycarbonate-Based Resin (A)>

The polycarbonate-based resin (A) may be produced by a known method without any particular limitation.

A method of producing the polycarbonate-based resin (A) is, for example, the following method: a dihydric phenol and a carbonate precursor are used as raw materials, and the resin is produced by a solution method (interfacial polycondensation method) or a melting method (ester exchange method). That is, the polycarbonate-based resin (A) may be produced by, for example, an interfacial polycondensation method including causing the dihydric phenol and the carbonate precursor such as phosgene to react with each other in the presence of a terminal stopper added as required, or an ester exchange method between the dihydric phenol and the carbonate precursor such as diphenyl carbonate.

The interfacial polycondensation method is not particularly limited, and may be a one-stage method including causing the dihydric phenol and the carbonate precursor to react with each other to provide the polycarbonate-based resin, or may be a two-stage method including: causing the dihydric phenol and the carbonate precursor to react with each other to produce a polycarbonate oligomer; and then causing the resultant polycarbonate oligomer and the dihydric phenol further added as required to react with each other to provide the polycarbonate-based resin.

An example of the two-stage method out of the interfacial polycondensation methods each including causing the dihydric phenol and phosgene to react with each other is specifically described below.

The branched polycarbonate-based resin (A-1) and the aromatic polycarbonate-based resin (A-2), which form the polycarbonate-based resin (A), may each be produced through a step (1) of causing a dihydric phenol and phosgene to react with each other in an organic solvent to produce a polycarbonate oligomer, and a subsequent step (2) of causing the polycarbonate oligomer, a dihydric phenol, and a terminal stopper added as required to react with each other to produce the polycarbonate-based resin.

(Step (1))

In this step, the dihydric phenol and phosgene are caused to react with each other in the organic solvent to produce the polycarbonate oligomer having a chloroformate group.

It is preferred to use, as the dihydric phenol, a compound represented by the following formula (i) in the case of the branched polycarbonate-based resin (A-1), or a compound represented by the following formula (ii) in the case of the aromatic polycarbonate-based resin (A-2):

(i)

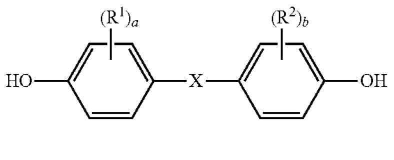

wherein in the formula (i), $R^1$, $R^2$, “a”, “b”, and X are as described above;

(ii)

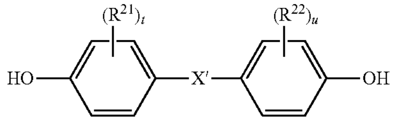

wherein in the formula (ii), $R^{21}$, $R^{22}$, “t”, “u”, and X' are as described above.

Examples of the dihydric phenol represented by each of the formulae (i) and (ii) include: bis(hydroxyphenyl)alkane-based dihydric phenols, such as 2,2-bis(4-hydroxyphenyl) propane [bisphenol A], bis(4-hydroxyphenyl)methane, 1,1-bis(4-hydroxyphenyl)ethane, and 2,2-bis(4-hydroxy-3,5-dimethylphenyl)propane; 4,4'-dihydroxydiphenyl; bis(4-hydroxyphenyl)cycloalkanes; bis(4-hydroxyphenyl) oxide; bis(4-hydroxyphenyl) sulfide; bis(4-hydroxyphenyl) sulfone; bis(4-hydroxyphenyl) sulfoxide; and bis(4-hydroxyphenyl) ketone. Those dihydric phenols may be used alone or as a mixture thereof.

Among them, bis(hydroxyphenyl)alkane-based dihydric phenols are preferred, and bisphenol A is more preferred. When bisphenol A is used as the dihydric phenol, there is obtained a branched polycarbonate-based resin (A-1) in which, in the formula (i), X represents an isopropylidene group and a=b=0, or an aromatic polycarbonate-based resin (A-2) in which, in the formula (ii), X' represents an isopropylidene group and t=u=0.

Examples of the dihydric phenol except bisphenol A include bis(hydroxyaryl)alkanes, bis(hydroxyaryl)cycloalkanes, dihydroxyaryl ethers, dihydroxydiaryl sulfides, dihydroxydiaryl sulfoxides, dihydroxydiaryl sulfones, dihydroxydiphenyls, dihydroxydiaryl fluorenes, and dihydroxydiaryl adamantanes. Those dihydric phenols may be used alone or as a mixture thereof.

Examples of the bis(hydroxyaryl)alkanes include bis(4-hydroxyphenyl)methane, 1,1-bis(4-hydroxyphenyl)ethane, 2,2-bis(4-hydroxyphenyl)butane, 2,2-bis(4-hydroxyphenyl) octane, bis(4-hydroxyphenyl)phenylmethane, bis(4-hydroxyphenyl)diphenylmethane, 2,2-bis(4-hydroxy-3-methylphenyl)propane, bis(4-hydroxyphenyl)naphthylmethane, 1,1-bis(4-hydroxy-3-tert-butylphenyl)propane, 2,2-bis(4-hydroxy-3-bromophenyl)propane, 2,2-bis(4-hydroxy-3,5-dimethylphenyl)propane, 2,2-bis(4-hydroxy-3-chlorophenyl)propane, 2,2-bis(4-hydroxy-3,5-dichlorophenyl) propane, and 2,2-bis(4-hydroxy-3,5-dibromophenyl) propane.

Examples of the bis(hydroxyaryl)cycloalkanes include 1,1-bis(4-hydroxyphenyl)cyclopentane, 1,1-bis(4-hydroxyphenyl)cyclohexane, 1,1-bis(4-hydroxyphenyl)-3,5,5-trimethylcyclohexane, 2,2-bis(4-hydroxyphenyl)norbornane, and 1,1-bis(4-hydroxyphenyl)cyclododecane. Examples of the dihydroxyaryl ethers include 4,4'-dihydroxydiphenyl ether and 4,4'-dihydroxy-3,3'-dimethylphenyl ether.

Examples of the dihydroxydiaryl sulfides include 4,4'-dihydroxydiphenyl sulfide and 4,4'-dihydroxy-3,3'-dimethyldiphenyl sulfide. Examples of the dihydroxydiaryl sulfoxides include 4,4'-dihydroxydiphenyl sulfoxide and 4,4'-dihydroxy-3,3'-dimethyldiphenyl sulfoxide. Examples of the dihydroxydiaryl sulfones include 4,4'-dihydroxydiphenyl sulfone and 4,4'-dihydroxy-3,3'-dimethyldiphenyl sulfone.

An example of the dihydroxydiphenyls is 4,4'-dihydroxydiphenyl. Examples of the dihydroxydiarylfluorenes include 9,9-bis(4-hydroxyphenyl)fluorene and 9,9-bis(4-hydroxy-3-methylphenyl)fluorene. Examples of the dihydroxydiaryl-adamantanes include 1,3-bis(4-hydroxyphenyl)adamantane, 2,2-bis(4-hydroxyphenyl)adamantane, and 1,3-bis(4-hydroxyphenyl)-5,7-dimethyladamantane.

Examples of dihydric phenols except those described above include 4,4'-[1,3-phenylenebis(1-methylethylidene)] bisphenol, 10,10-bis(4-hydroxyphenyl)-9-anthrone, and 1,5-bis(4-hydroxyphenylthio)-2,3-dioxapentane.

Phosgene is a compound that is typically obtained by causing chlorine and carbon monoxide to react with each other at the following ratio through use of activated carbon as a catalyst: 1.01 mol to 1.3 mol of carbon monoxide is used with respect to 1 mol of chlorine. When phosgene to be used is used as a phosgene gas, a phosgene gas containing about 1 vol % to about 30 vol % of unreacted carbon monoxide may be used. Phosgene in a liquefied state may also be used.

To produce the polycarbonate oligomer in the step (1), an aqueous alkali solution of the dihydric phenol, phosgene, and the organic solvent are introduced into a reactor, and the dihydric phenol and phosgene are caused to react with each other. The usage amount of the organic solvent is desirably selected so that a volume ratio between an organic solvent phase and an aqueous phase may be from 5/1 to 1/7, preferably from 2/1 to 1/4. In the reactor, heat is generated by a reaction in which a terminal group of the dihydric phenol is turned into a chloroformate by phosgene, and a reaction in which phosgene is decomposed by an alkali, and hence the temperature of a reaction product increases.

Accordingly, the reaction product is preferably cooled so that its temperature may be from 0° C. to 50° C., more preferably from 5° C. to 40° C. Phosgene is preferably used so that the usage amount of phosgene may be from 1.1 mol to 1.5 mol with respect to 1 mol of the dihydric phenol, that is, may be excess. A reaction liquid obtained after the reaction is separated into an aqueous phase and an organic phase. Thus, the organic phase containing the polycarbonate oligomer is obtained. The weight-average molecular weight of the resultant polycarbonate oligomer is typically 5,000 or less, and the degree of polymerization thereof is typically 20 or less, preferably from 2 to 10. At the time of the production of the polycarbonate oligomer, an amine-based polymerization catalyst to be used in the subsequent step (2) may be used for accelerating the reaction. A terminal stopper to be used as a molecular weight modifier for a polycarbonate may be used. Examples of a compound to be used as the terminal terminator may include monohydric phenols, such as phenol, p-cresol, p-tert butylphenol, p-tert octylphenol, p-cumylphenol, 3-pentadecylphenol, bromophenol, tribromophenol, and nonylphenol. Among them, p-tert-butylphenol, p-cumylphenol, and phenol are preferred in terms of, for example, economical efficiency and ease of availability. In addition, the use of 3-pentadecylphenol can largely improve the fluidity of the polycarbonate oligomer to be obtained.

The reactor to be used at the time of the production of the polycarbonate oligomer is preferably a stationary mixer, that is, a static mixer. The stationary mixer is preferably a tubular reactor including, in itself, an element having an action of dividing, turning, and reversing a fluid. When a vessel-type stirring vessel including a stirring machine is further used after the stationary mixer, oligomerization can be accelerated. Accordingly, such reactors are preferably used in combination.

A reaction mixed liquid containing the polycarbonate oligomer having a chloroformate group is obtained through the step (1). The reaction mixed liquid is separated into an organic phase containing the polycarbonate oligomer and an aqueous phase by using a separation method such as settling, and the organic phase containing the polycarbonate oligomer is used in the step (2) to be described later.

(Step (2))

In the step (2), the polycarbonate oligomer obtained in the step (1), the dihydric phenol as required, and the terminal stopper to be used if desired are caused to react with each other to produce the polycarbonate-based resin. The polycarbonate oligomer and the dihydric phenol are subjected to a polycondensation reaction so that the molecular weight of a reaction product may be adjusted within a target molecular weight range. The polycondensation reaction is performed until the viscosity-average molecular weight of the polycarbonate-based resin to be obtained falls within the above-mentioned range. Specifically, the organic solvent phase containing the polycarbonate oligomer that has been separated in the step (1), the terminal stopper to be used if desired, the polymerization catalyst to be used if desired, an organic solvent, an aqueous alkali solution, and an aqueous alkali solution of the dihydric phenol are mixed, and the mixture is subjected to interfacial polycondensation at a temperature in the range of typically from 0° C. to 50° C., preferably from 20° C. to 40° C.

Examples of the alkali of each of the aqueous alkali solutions, the organic solvent, and the terminal stopper to be used in this step may include the same examples as those described for the step (1). The usage amount of the organic solvent in the step (2) is typically selected so that a volume ratio between the organic phase and aqueous phase of a reaction liquid to be obtained may be preferably from 7/1 to 1/1, more preferably from 5/1 to 2/1.

With regard to a reactor to be used in the step (2), the reaction can be completed with only one reactor depending on the processing capacity of the reactor. However, a plurality of reactors such as a second reactor and a third reactor subsequent to the first reactor may be used as required. For example, a stirring vessel, a multistage column-type stirring vessel, a non-stirring vessel, a static mixer, a line mixer, an orifice mixer, and/or piping may be used as any such reactor.

The resultant reaction liquid is subjected to oil-water separation because the reaction liquid includes the organic solvent phase containing the polycarbonate-based resin and the aqueous phase containing an unreacted dihydric phenol. An apparatus for the separation may be, for example, a settling vessel or a centrifugal separator. The separated organic solvent phase containing the polycarbonate-based resin is subjected to alkali washing, acid washing, and pure water washing in the stated order to provide an organic solvent phase containing the purified polycarbonate-based resin. The organic solvent phase containing the purified polycarbonate-based resin is concentrated as required, and is then subjected to kneader treatment, warm water granulation, or the like. Thus, powder of the polycarbonate-based resin can be obtained. The organic solvent remains in the resultant powder of the polycarbonate-based resin, and hence the performance of drying treatment such as heating treatment, can provide polycarbonate-based resin powder from which the organic solvent has been removed. The resultant polycarbonate-based resin powder may be pelletized with a pelletizer or the like to provide various molded articles.

(Branching Agent)

The branched polycarbonate-based resin (A-1) may be produced by adding any branching agent. The aromatic polycarbonate-based resin (A-2) may be produced by adding no branching agent. The branching agent may be added in the step (1) and/or the step (2). When the branching agent is added in the step (1), the branching agent is added together with the dihydric phenol and phosgene, and the materials are caused to react with each other. A branching agent represented by the formula (iii) to be described later can be dissolved in an aqueous alkali solution, and is hence desirably introduced after having been dissolved in the aqueous alkali solution, though whether or not the dissolution should be performed varies depending on the branching agent to be used. In addition, a branching agent that is hardly dissolved in an aqueous alkali solution is desirably introduced after having been dissolved in an organic solvent such as methylene chloride.

The branching agent may be added in any one of the step (1) and the step (2), or in both of the steps (1) and (2). The branching agent may be further added in the step (2). It is preferred that the branching agent be finally added in an addition amount of 0.30 mol % or more and 3.0 mol % or less with respect to the total number of moles of the dihydric phenol compound, the branching agent, and the terminal stopper added as required that are raw materials in terms of total amount of the branching agent to be added in the step (1) and the step (2). The adoption of the addition amount can provide the branched polycarbonate-based resin (A-1) having the above-mentioned preferred branching ratio. The addition amount of the branching agent with respect to the total number of moles of the dihydric phenol compound, the branching agent, and the terminal stopper added as required is preferably 0.35 mol % or more, more preferably 0.40 mol % or more, still more preferably 0.43 mol % or more, still more preferably 0.45 mol % or more from the viewpoint of further improving the thin-wall flame retardancy of a molded article to be obtained. The addition amount is preferably 2.5 mol % or less, more preferably 2.0 mol % or less, still more preferably 1.5 mol % or less, still more preferably 1.0 mol % or less from the viewpoint of obtaining satisfactory thin-wall flame retardancy, satisfactory optical transparency, a satisfactory mechanical characteristic, satisfactory moldability, and satisfactory fluidity.

Specifically, a branching agent represented by the following formula (iii) is used at the time of the production of a resin having a branched structure represented by the formula (II), the resin being a branched polycarbonate resin.

(iii)

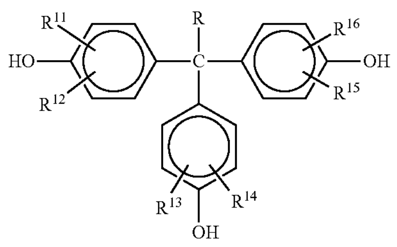

wherein in the formula (iii), R represents a hydrogen atom or a group selected from the group consisting of: an alkyl group having 1 to 5 carbon atoms; a cycloalkyl group having 6 to 20 carbon atoms; a cycloalkoxy group having 6 to 20 carbon atoms; an alkenyl group having 2 to 10 carbon atoms; and an aryl group having 6 to 14 carbon atoms, $R^{11}$ to $R^{16}$ each independently represent a hydrogen atom, an alkyl group having 1 to 5 carbon atoms, or a halogen atom.

The branching agent represented by the formula (iii) is described in more detail.

Examples of the alkyl group having 1 to 5 carbon atoms that is represented by R include a methyl group, an ethyl group, a n-propyl group, a n-butyl group, and a n-pentyl group. Examples of the alkyl group having 1 to 5 carbon atoms that is represented by any one of $R^{11}$ to $R^{16}$ may include a methyl group, an ethyl group, a n-propyl group, a n-butyl group, and a n-pentyl group, and examples of the halogen atom may include a chlorine atom, a bromine atom, and a fluorine atom.

More specific examples of the branching agent represented by the formula (iii) include compounds each having 3 or more functional groups, such as: 1,1,1-tris(4-hydroxyphenyl)methane; 1,1,1-tris(4-hydroxyphenyl)ethane; 1,1,1-tris(4-hydroxyphenyl)propane; 1,1,1-tris(2-methyl-4-hydroxyphenyl)methane; 1,1,1-tris(2-methyl-4-hydroxyphenyl)ethane; 1,1,1-tris(3-methyl-4-hydroxyphenyl)methane; 1,1,1-tris(3-methyl-4-hydroxyphenyl)ethane; 1,1,1-tris(3,5-dimethyl-4-hydroxyphenyl)methane; 1,1,1-tris(3,5-dimethyl-4-hydroxyphenyl)ethane; 1,1,1-tris(3-chloro-4-hydroxyphenyl)methane; 1,1,1-tris(3-chloro-4-hydroxyphenyl)ethane; 1,1,1-tris(3,5-dichloro-4-hydroxyphenyl)methane; 1,1,1-tris(3,5-dichloro-4-hydroxyphenyl)ethane; 1,1,1-tris(3-bromo-4-hydroxyphenyl)methane; 1,1,1-tris(3-bromo-4-hydroxyphenyl)ethane; 1,1,1-tris(3,5-dibromo-4-hydroxyphenyl)methane; 1,1,1-tris(3,5-dibromo-4-hydroxyphenyl)ethane; 4,4'-[1-[4-[1-(4-hydroxyphenyl)-1-methylethyl]phenyl]ethylidene]bisphenol; α,α',α"-tris(4-hydroxyphenyl)-1,3,5-triisopropylbenzene; 1-[α-methyl-α-(4'-hydroxyphenyl)ethyl]-4-[α',α'-bis(4"-hydroxyphenyl)ethyl]benzene; and phloroglucin, trimellitic acid, and isatinbis(o-cresol). Among those described above, 1,1,1-tris(4-hydroxyphenyl)ethane (hereinafter sometimes abbreviated as "THPE") is preferably used from the viewpoints of availability, reactivity, and economical efficiency.

The use of the branching agent represented by the formula (iii) enables the production of a polycarbonate-based resin having a branched structure represented by the formula (II). The polycarbonate-based resin obtained by the above-mentioned production method contains at least a branched polycarbonate-based resin having one structural unit derived from the branching agent represented by the formula (iii), and may also contain a branched polycarbonate-based resin having two or more structural units each derived from the branching agent represented by the formula (iii). Even when the polycarbonate-based resin contains such branched polycarbonate-based resin having two or more structural units each derived from the branching agent, the polycarbonate-based resin is the branched polycarbonate-based resin (A-1), and its branching ratio may be actually measured by $^1$H-NMR measurement.

<Polymerization Catalyst>

The polymerization catalyst may be used in any of the step (1) and the step (2), and, for example, the amine-based catalyst may be used.

As the amine-based catalyst, a tertiary amine or a salt thereof, or a quaternary ammonium salt may be used. Examples of the tertiary amine include triethylamine, tributylamine, N,N-dimethylcyclohexylamine, pyridine, and dimethylaniline, and examples of the tertiary amine salt include hydrochloric acid salts and bromic acid salts of those tertiary amines. Examples of the quaternary ammonium salt may include trimethylbenzylammonium chloride, triethylbenzylammonium chloride, tributylbenzylammonium chloride, trioctylmethylammonium chloride, tetrabutylammonium chloride, and tetrabutylammonium bromide. As the amine-based catalyst, a tertiary amine is preferred, and triethylamine is particularly suitable. Each of those catalysts may be introduced as it is when the catalyst is in a liquid state or after having been dissolved in an organic solvent or water. In addition, a catalyst in a solid state may be introduced after having been dissolved in an organic solvent or water.

When the polymerization catalyst is used in the step (2), the catalyst is used at a molar ratio of, for example, 0.0005 or more and 0.030 or less with respect to a chloroformate group of the polycarbonate oligomer obtained in the step (1). When the amount of the polymerization catalyst to be added in the step (2) falls within the range, the flame retardancy of the polycarbonate-based resin to be obtained can be improved.

The amount of the polymerization catalyst to be added in the step (2) is more preferably 0.001 or more, still more preferably 0.002 or more, still more preferably 0.004 or more, still more preferably 0.006 or more in terms of molar ratio with respect to a chloroformate group of the polycarbonate oligomer, and is more preferably 0.025 or less, still more preferably 0.020 or less with respect thereto.

[Perfluoroalkylsulfonimide (B)]

The polycarbonate-based resin composition of the present invention includes 0.05 part by mass or more and 2.0 parts by mass or less of the perfluoroalkylsulfonimide (B) represented by the following formula (1) (hereinafter also referred to as "perfluoroalkylsulfonimide (B)") with respect to 100 parts by mass of the polycarbonate-based resin (A). The perfluoroalkylsulfonimides (B) may be used alone or in combination thereof.

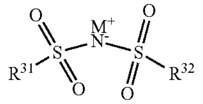

(1)

wherein in the formula (1), $R^{31}$ represents a perfluoroalkyl group having 1 to 3 carbon atoms, $R^{32}$ represents a perfluoroalkyl group having 1 to 4 carbon atoms, and $M^+$ represents at least one kind of monovalent cation selected from the group consisting of: a lithium ion; a sodium ion; and a potassium ion.

$R^{31}$ represents preferably a perfluoroalkyl group having 1 or 2 carbon atoms, more preferably a perfluoroalkyl group having 1 carbon atom from the viewpoint of further improving the thin-wall flame retardancy of a molded article to be obtained, and $R^{32}$ represents preferably a perfluoroalkyl group having 1 to 3 carbon atoms, more preferably a perfluoroalkyl group having 1 or 2 carbon atoms, still more preferably a perfluoroalkyl group having 1 carbon atom.

The perfluoroalkyl group having 1 carbon atom is a perfluoromethyl group ($—CF_3$ group), the perfluoroalkyl group having 2 carbon atoms is a perfluoroethyl group ($—CF_2CF_3$ group), and the perfluoroalkyl group having 3 carbon atoms is a perfluorobutyl group ($—CF_2CF_2CF_3$ group).

$M^+$ represents at least one kind selected from the group consisting of: a lithium ion; a sodium ion; and a potassium ion from the viewpoints of improving the thin-wall flame retardancy of the molded article and suppressing the yellow tinge thereof, and $M^+$ represents preferably at least one kind selected from the group consisting of: a lithium ion; and a potassium ion, more preferably a potassium ion.

The perfluoroalkylsulfonimide (B) represented by the formula (1) is preferably at least one kind selected from the group consisting of: potassium bis(trifluoromethanesulfonyl)imide; lithium bis(trifluoromethanesulfonyl)imide; sodium bis(trifluoromethanesulfonyl)imide; potassium nonafluoro-N-[(trifluoromethane)sulfonyl]butanesulfonylamide; sodium nonafluoro-N-[(trifluoromethane)sulfonyl]butanesulfonylamide; and lithium nonafluoro-N-[(trifluoromethane)sulfonyl]butanesulfonylamide, more preferably at least one kind selected from the group consisting of: potassium bis(trifluoromethanesulfonyl)imide; lithium bis(trifluoromethanesulfonyl)imide; and sodium bis (trifluoromethanesulfonyl)imide, still more preferably at least one kind selected from the group consisting of: potassium bis(trifluoromethanesulfonyl)imide; and lithium bis (trifluoromethanesulfonyl)imide, still more preferably potassium bis(trifluoromethanesulfonyl)imide.

Those compounds are available as commercial products, and for example, EF-N Series manufactured by Mitsubishi Materials Electronic Chemicals Co., Ltd. may be used.

The polycarbonate-based resin composition of the present invention includes 0.05 part by mass or more and 2.0 parts by mass or less of the perfluoroalkylsulfonimide (B) with respect to 100 parts by mass of the polycarbonate-based resin (A).

The content of the perfluoroalkylsulfonimide (B) in the polycarbonate-based resin composition of the present invention is preferably 0.06 part by mass or more with respect to 100 parts by mass of the polycarbonate-based resin (A) from the viewpoint of further improving the thin-wall flame retardancy, and the content is more preferably 0.07 part by mass or more, still more preferably 0.09 part by mass or more, still more preferably 0.13 part by mass or more, still more preferably 0.18 part by mass or more with respect thereto from the viewpoint of even further improving the thin-wall flame retardancy. The content is preferably 1.8 parts by mass or less, more preferably 1.5 parts by mass or less, still more preferably 1.2 parts by mass or less with respect thereto from the viewpoint of obtaining satisfactory optical transparency, a satisfactory color tone, and a satisfactory mechanical characteristic. When the composition includes the plurality of kinds of perfluoroalkylsulfonimides (B), the total amount thereof falls within the above-mentioned ranges.

The total content of the polycarbonate-based resin (A) and the perfluoroalkylsulfonimide (B) in the polycarbonate-based resin composition of the present invention is preferably 50 mass % or more, more preferably 60 mass % or more, still more preferably 70 mass % or more, still more preferably 80 mass % or more, still more preferably 90 mass % or more, still more preferably 95 mass % or more, still more preferably 98 mass % or more, still more preferably 99 mass % or more when the entirety of the polycarbonate-based resin composition is defined as 100 mass % from the viewpoint of further suppressing the yellow tinge and opacity of a molded article to be obtained, and from the viewpoint of further improving the thin-wall flame retardancy and optical transparency thereof. Although the upper limit of the total content of the polycarbonate-based resin (A) and the perfluoroalkylsulfonimide (B) is not particularly limited, the total content is, for example, 100 mass % or less.

[Antioxidant (C)]

The polycarbonate-based resin composition of the present invention preferably further includes an antioxidant (C) from the viewpoint of further suppressing the yellow tinge and the opacity, and from the viewpoint of further improving the thin-wall flame retardancy and the optical transparency. A known antioxidant may be used as the antioxidant (C), and at least one kind selected from a phosphorus-based antioxidant and a phenol-based antioxidant may be preferably used.

Examples of the phosphorus-based antioxidant include triphenyl phosphite, diphenyl nonyl phosphite, diphenyl (2-ethylhexyl) phosphite, tris(2,4-di-tert butylphenyl) phosphite, tris(nonylphenyl) phosphite, diphenyl isooctyl phosphite, 2,2'-methylenebis(4,6-di-tert-butylphenyl)octyl phosphite, diphenyl isodecyl phosphite, diphenyl mono(tridecyl) phosphite, phenyl diisodecyl phosphite, phenyl di(tridecyl) phosphite, tris(2-ethylhexyl) phosphite, tris(isodecyl) phosphite, tris(tridecyl) phosphite, dibutyl hydrogen phosphite, trilauryl trithiophosphite, tetrakis(2,4-di-tert-butylphenyl)-4,4'-biphenylene diphosphonite, 4,4'-isopropylidenediphenol dodecyl phosphite, 4,4'-isopropylidenediphenol tridecyl phosphite, 4,4'-isopropylidenediphenol tetradecyl phosphite, 4,4'-isopropylidenediphenol pentadecyl phosphite, 4,4'-butylidenebis(3-methyl-6-tert-butylphenyl)ditridecyl phosphite, bis(2,6-di-tert-butyl-4-methylphenyl)pentaerythritol diphosphite, bis(nonylphenyl)pentaerythritol diphosphite, distearyl-pentaerythritol diphosphite, phenyl bisphenol A pentaerythritol diphosphite, tetraphenyl dipropylene glycol diphosphite, 1,1,3-tris(2-methyl-4-di-tridecylphosphite-5-tert-butylphenyl)butane, 3,4,5,6-dibenzo-1,2-oxaphosphane, triphenylphosphine, diphenylbutylphosphine, diphenyloctadecylphosphine, tris(p-tolyl)phosphine, tris(p-nonylphenyl)phosphine, tris(naphthyl)phosphine, diphenyl (hydroxymethyl)phosphine, diphenyl(acetoxymethyl)phosphine, diphenyl(8-ethylcarboxyethyl)phosphine, tris(p-chlorophenyl)phosphine, tris(p-fluorophenyl)phosphine, benzyldiphenylphosphine, diphenyl(β-cyanoethyl)phosphine, diphenyl(p-hydroxyphenyl)phosphine, diphenyl(1,4-dihydroxyphenyl)-2-phosphine, phenylnaphthylbenzylphosphine, and bis(2,4-dicumylphenyl)pentaerythritol diphosphite.

Specifically, examples of the phosphorus-based antioxidant may include commercial products, such as "Irgafos 168" (manufactured by BASF Japan Ltd., trademark), "Irgafos 12" (manufactured by BASF Japan Ltd., trademark), "Irgafos 38" (manufactured by BASF Japan Ltd., trademark), "ADK STAB 329K" (manufactured by ADEKA Corporation, trademark), "ADK STAB PEP-36" (manufactured by ADEKA Corporation, trademark), "ADK STAB PEP-8" (manufactured by ADEKA Corporation, trademark), "ADK STAB 2112" (manufactured by ADEKA Corporation, trademark), "Sandstab P-EPQ" (manufactured by Clariant AG, trademark), "Weston 618" (manufactured by SI Group Inc., trademark), "Weston 619G" (manufactured by SI Group Inc., trademark), and "Weston 624" (manufactured by SI Group Inc., trademark), and "Doverphos S-9228PC" (manufactured by Dover Chemical Corporation). Examples of the phenol-based antioxidant include triethylene glycol-bis[3-(3-tert-butyl-5-methyl-4-hydroxyphenyl)propionate], 1,6-hexanediol-bis[3-(3,5-di-tert-butyl-4-hydroxyphenyl) propionate], pentaerythritol-tetrakis[3-(3,5-di-tert butyl-4-hydroxyphenyl)propionate], octadecyl-3-(3,5-di-tert-butyl-4-hydroxyphenyl)propionate, 1,3,5-trimethyl-2,4,6-tris(3,5-di-tert-butyl-4-hydroxybenzyl)benzene, N,N-hexamethylenebis(3,5-di-tert-butyl-4-hydroxy-hydrocinnamide), 3,5-di-tert butyl-4-hydroxy-benzylphosphonate diethyl ester, tris(3,5-di-tert-butyl-4-hydroxybenzyl) isocyanurate, and 3,9-bis[1,1-dimethyl-2-[β-(3-tert-butyl-4-hydroxy-5-methylphenyl)propionyloxy] ethyl]-2,4,8,10-tetraoxaspiro(5,5)undecane.

Specifically, examples of the phenol-based antioxidant may include commercial products, such as "Irganox 1010" (manufactured by BASF Japan Ltd., trademark), "Irganox 1076" (manufactured by BASF Japan Ltd., trademark), "Irganox 1330" (manufactured by BASF Japan Ltd., trademark), "Irganox 3114" (manufactured by BASF Japan Ltd., trademark), "Irganox 3125" (manufactured by BASF Japan Ltd., trademark), "BHT" (manufactured by Takeda Pharmaceutical Company Limited, trademark), "Cyanox 1790" (manufactured by Solvay S.A., trademark), and "Sumilizer GA-80" (manufactured by Sumitomo Chemical Company, Limited, trademark).

The antioxidants (C) may be used alone or in combination thereof. The content of the antioxidant (C) in the polycarbonate-based resin composition of the present invention is preferably 0.03 part by mass or more, more preferably 0.05 part by mass or more, still more preferably 0.07 part by mass or more, still more preferably 0.08 part by mass or more with respect to 100 parts by mass of the polycarbonate-based resin (A) because the yellow tinge and opacity of a molded article to be obtained can be even further suppressed, and from the viewpoint of further improving the thin-wall flame retardancy and optical transparency thereof. The content is preferably 0.50 part by mass or less, more preferably 0.20 part by mass or less, still more preferably 0.18 part by mass or less with respect thereto from the viewpoint of further improving the thin-wall flame retardancy, and from the viewpoint of obtaining satisfactory optical transparency, a satisfactory color tone, and a satisfactory mechanical characteristic. When the plurality of kinds of antioxidants (C) are used, the total amount thereof falls within the above-mentioned ranges.

[Release Agent (D)]

The polycarbonate-based resin composition of the present invention preferably further includes a release agent (D) from the viewpoint of improving its releasability. The release agent (D) is not particularly limited as long as the release agent (D) can be blended into the polycarbonate-based resin to improve the releasability of the composition at the time of its molding. For example, beeswax, glycerin monostearate, glycerin tristearate, pentaerythritol monostearate, pentaerythritol tristearate, pentaerythritol tetrastearate, a montanic acid ester wax, or a carboxylic acid ester may be used.

The release agents (D) may be used alone or in combination thereof. The content of the release agent (D) in the polycarbonate-based resin composition of the present invention is preferably 0.01 part by mass or more, more preferably 0.02 part by mass or more, still more preferably 0.03 part by mass or more with respect to 100 parts by mass of the polycarbonate-based resin (A) from the viewpoint of improving the releasability of the composition. The content is preferably 5.0 parts by mass or less, more preferably 2.0 parts by mass or less, still more preferably 1.0 part by mass or less, still more preferably 0.5 part by mass or less with respect thereto from the viewpoint of further improving the thin-wall flame retardancy, and from the viewpoint of obtaining satisfactory optical transparency, a satisfactory color tone, and a satisfactory mechanical characteristic. When the plurality of kinds of release agents (D) are used, the total amount thereof falls within the above-mentioned ranges.

[Silicone Compound (E)]

The polycarbonate-based resin composition of the present invention preferably further includes a silicone compound (E). The silicone compound (E) has the following effects: such an effect that the compound acts like a lubricant at the time of the pelletization of the polycarbonate-based resin composition of the present invention to suppress the yellowing of the resultant pellet; an improving effect on the flame retardancy thereof; and a preventing effect on an appearance failure such as the occurrence of a silver streak at the time of the molding of the composition.

When the polycarbonate-based resin composition is used in an optical application, a difference in refractive index between the silicone compound and the polycarbonate-based resin is preferably reduced to the extent possible, and the refractive index of the silicone compound (E) is preferably from 1.45 to 1.65, more preferably from 1.48 to 1.60.

A silicone compound, which has a hydrocarbon group having 1 to 12 carbon atoms bonded to a silicon atom, may be used as the silicone compound (E).

Each of a silicone compound (e1) free of any functional group and a silicone compound (e2) having a functional group may be used as the silicone compound (E).

In one aspect of the present invention, the silicone compound (e1) free of any functional group is preferably used as the silicone compound (E).

The silicone compound (e1) free of any functional group is a polymer or copolymer formed of a structural unit represented by $(R^{S2})_rSiO_{(4-r)/2}$ wherein $R^{S2}$s each independently represent a hydrocarbon group having 1 to 12 carbon atoms, and "r" represents an integer satisfying $0<r\leq3$. Examples of the hydrocarbon group represented by $R^{S2}$ include a methyl group, an ethyl group, and a phenyl group.

Specific compound examples of the silicone compound (e1) free of any functional group include polydimethylsiloxane, polymethylethylsiloxane, polymethylphenylsiloxane, and polydimethyldiphenylsiloxane. Among them, a phenyl group-containing polysiloxane, such as polymethylphenylsiloxane or polydimethyldiphenylsiloxane, is preferably used from the viewpoint that the maintenance of the transparency of an article molded out of the polycarbonate-based resin composition through the adjustment of the compatibility of the polysiloxane with a polycarbonate and the refractive index thereof, and an improvement in flame retardancy of the molded article can be achieved.

In another aspect of the present invention, the silicone compound (e2) having a functional group is preferably used as the silicone compound (E).

The silicone compound (e2) having a functional group is a polymer or copolymer formed of a structural unit represented by $(R^{S1})_r(R^{S2})_qSiO_{(4-p-q)/2}$ wherein $R^{S1}$s each independently represent a functional group, $R^{S2}$s each independently represent a hydrocarbon group having 1 to 12 carbon atoms, and "p" and "q" represent integers satisfying $0<p\leq3$, $0\leq q<3$, and $0<p+q\leq3$. Examples of the functional group represented by RSI include an alkoxy group, an aryloxy group, a polyoxyalkylene group, a hydrogen group, a hydroxy group, a carboxyl group, a silanol group, an amino group, a mercapto group, an epoxy group, and a vinyl group. Among them, an alkoxy group, a hydrogen group, a hydroxy group, an epoxy group, and a vinyl group are preferred, and a methoxy group and a vinyl group are more preferred. Examples of the hydrocarbon group represented by $R^{S2}$ include a methyl group, an ethyl group, and a phenyl group.

Among the silicone compounds (e2) each having a functional group, a functional group-containing silicone compound formed of a structural unit containing a phenyl group as the hydrocarbon group represented by $R^{S2}$ in the formula is particularly highly useful. The compound may be a compound containing one kind of functional group as the functional group represented by $R^{S1}$ in the formula, may be a compound containing a plurality of different kinds of functional groups as such functional groups, or may be a mixture thereof. Such a compound that the value of the ratio of the molecular weight of the functional group ($R^{S1}$) to the molecular weight of the hydrocarbon group ($R^{S2}$) in the formula is from 0.1 to 3, preferably from 0.3 to 2 is suitably used. The silicone compound containing a functional group may be liquid or powdery. In the case of a liquid compound, its viscosity at room temperature is preferably from about 10 cSt to about 500,000 cSt.

Specifically, examples of the silicone compound (E) may include commercial products, such as "KR-511" (manufactured by Shin-Etsu Chemical Co., Ltd., product name), "KR-2710" (manufactured by Shin-Etsu Chemical Co., Ltd., product name), "TSF437" (manufactured by Momentive Performance Materials Inc., product name), "TSF431" (manufactured by Momentive Performance Materials Inc., product name), "TSF433" (manufactured by Momentive Performance Materials Inc., product name), "TSF4300" (manufactured by Momentive Performance Materials Inc., product name), and "SFR320" (manufactured by Momentive Performance Materials Inc., product name).

The silicone compounds (E) may be used alone or in combination thereof. The content of the silicone compound (E) in the polycarbonate-based resin composition of the present invention is preferably 0.01 part by mass or more, more preferably 0.05 part by mass or more, still more preferably 0.10 part by mass or more, still more preferably 0.20 part by mass or more with respect to 100 parts by mass of the polycarbonate-based resin (A) from the viewpoint that the compound acts like a lubricant at the time of the pelletization of the polycarbonate-based resin composition of the present invention to suppress the yellowing of the resultant pellet, and from the viewpoint of preventing an appearance failure such as the occurrence of a silver streak at the time of the molding of the composition. The content is preferably 0.05 part by mass or more, more preferably 0.10 part by mass or more, still more preferably 0.30 part by mass or more, still more preferably 0.50 part by mass or more with respect thereto from the viewpoint of further improving the thin-wall flame retardancy of the resultant molded article. The content is preferably 5.0 parts by mass or less, more preferably 2.0 parts by mass or less, still more preferably 1.2 parts by mass or less with respect thereto from the viewpoint of obtaining satisfactory optical transparency, a satisfactory color tone, and a satisfactory mechanical characteristic. The content of the silicone compound (E) may be set to 1.0 part by mass or less, or 0.5 part by mass or less with respect to 100 parts by mass of the polycarbonate-based resin (A) from the viewpoint of obtaining satisfactory optical transparency, a satisfactory color tone, and a satisfactory mechanical characteristic.

When the silicone compound (E) is the silicone compound (e1) free of any functional group, its content is preferably 0.10 part by mass or more and 2.0 parts by mass or less, more preferably 0.30 part by mass or more and 1.2 parts by mass or less, still more preferably 0.60 part by mass or more and 1.2 parts by mass or less with respect to 100 parts by mass of the polycarbonate-based resin (A) from the viewpoint of achieving both of the thin-wall flame retardancy, and satisfactory optical transparency and a satisfactory color tone. When the silicone compound (E) is the silicone compound (e2) having a functional group, its content is preferably 0.05 part by mass or more and 1.0 part by mass or less, more preferably 0.10 part by mass or more and 0.50 part by mass or less with respect thereto.

When the plurality of kinds of silicone compounds (E) are used, the total amount thereof falls within the above-mentioned ranges.

[Other Additive]

In addition to the above-mentioned components (A) to (E), various additives may each be incorporated into the polycarbonate-based resin composition of the present invention to the extent that the color tone, thin-wall flame retardancy, optical transparency, and the like of the molded article to be obtained are not adversely affected. Examples of those additives may include a flame retardant except the perfluoroalkylsulfonimide (B), a polyether, polytetrafluoroethylene, an alicyclic epoxy compound, a UV absorber, and a diffuser.

In addition, from the viewpoint of improving optical transparency and a color tone in the polycarbonate-based resin composition of the present invention, the total content of a perfluoroalkane sulfonic acid metal salt and an aromatic ring-containing sulfonic acid metal salt each serving as one kind of flame retardant is preferably less than 0.05 part by mass, more preferably less than 0.03 part by mass, still more preferably less than 0.01 part by mass, still more preferably less than 0.005 part by mass, still more preferably less than 0.001 part by mass with respect to 100 parts by mass of the polycarbonate-based resin (A). It is still more preferred that the polycarbonate-based resin composition of the present invention be free of the perfluoroalkane sulfonic acid metal salt and the aromatic ring-containing sulfonic acid metal salt.

Examples of the perfluoroalkane sulfonic acid metal salt include potassium trifluoromethanesulfonate, potassium nonafluorobutanesulfonate, potassium perfluorohexanesulfonate, potassium perfluorooctanesulfonate, sodium pentafluoroethanesulfonate, sodium perfluorobutanesulfonate, sodium perfluorooctanesulfonate, lithium trifluoromethanesulfonate, lithium perfluorobutanesulfonate, lithium perfluoroheptanesulfonate, cesium trifluoromethanesulfonate, cesium perfluorobutanesulfonate, cesium perfluorooctanesulfonate, cesium perfluorohexanesulfonate, rubidium perfluorobutanesulfonate, and rubidium perfluorohexanesulfonate.

Examples of the aromatic ring-containing sulfonic acid metal salt include disodium diphenyl sulfide-4,4'-disulfonate, dipotassium diphenyl sulfide-4,4'-disulfonate, potassium 5-sulfoisophthalate, sodium 5-sulfoisophthalate, polysodium polyethylene terephthalate polysulfonate, calcium 1-methoxynaphthalene-4-sulfonate, disodium 4-dodecyl phenyl ether disulfonate, polysodium poly(2,6-dimethylphenylene oxide) polysulfonate, polysodium poly(1,3-phenylene oxide) polysulfonate, polysodium poly(1,4-phenylene oxide) polysulfonate, polypotassium poly(2,6-diphenylphenylene oxide) polysulfonate, lithium poly(2-fluoro-6-butylphenylene oxide) polysulfonate, potassium benzenesulfonate, sodium benzenesulfonate, sodium p-toluenesulfonate, strontium benzenesulfonate, magnesium benzenesulfonate, dipotassium p-benzenedisulfonate, dipotassium naphthalene-2,6-disulfonate, calcium biphenyl-3,3'-disulfonate, sodium diphenyl sulfone-3-sulfonate, potassium diphenyl sulfone-3-sulfonate, dipotassium diphenyl sulfone-3,3'-disulfonate, dipotassium diphenyl sulfone-3,4'-disulfonate, sodium α,α,α-trifluoroacetophenone-4-sulfonate, dipotassium benzophenone-3,3'-disulfonate, disodium thiophene-2,5-disulfonate, dipotassium thiophene-2,5-disulfonate, calcium thiophene-2,5-disulfonate, sodium benzothiophenesulfonate, potassium diphenyl sulfoxide-4-sulfonate, a formalin condensate of sodium naphthalenesulfonate, and a formalin condensate of sodium anthracenesulfonate.

The polycarbonate-based resin composition of the present invention can suppress the yellow tinge and opacity of a molded article to be obtained, and can improve the thin-wall flame retardancy and optical transparency thereof. Those properties are specifically as described below, though the properties are described in detail in Examples.

<Light Transmittance>

The total light transmittance of the 3-millimeter thick portion of a three-stage plate, which is obtained by subjecting the polycarbonate-based resin composition of the present invention to injection molding under the conditions of a cylinder temperature of 280° C., a mold temperature of 80° C., and a cycle time of 31 seconds, is preferably 80% or more, more preferably 85% or more, still more preferably 87% or more, still more preferably 88% or more from the viewpoint of further improving the optical transparency. The upper limit of the total light transmittance is not particularly limited because the total light transmittance is preferably as high as possible from the viewpoint of the optical transparency. However, the total light transmittance is, for example, 100% or less, and may be 95% or less, or 92% or less.

The total light transmittance of a 5-millimeter thick plate, which is obtained by subjecting the polycarbonate-based resin composition of the present invention to injection molding under the conditions of a cylinder temperature of 280° C., a mold temperature of 80° C., and a cycle time of 53 seconds, is also preferably 80% or more, more preferably 85% or more, still more preferably 87% or more, still more preferably 88% or more.

The upper limit of the total light transmittance is not particularly limited because the total light transmittance is preferably as high as possible from the viewpoint of the optical transparency. However, the total light transmittance is, for example, 100% or less, and may be 95% or less, or 92% or less.

The total light transmittance may be measured in conformity with JIS K 7375:2008.

<YI Value>

The YI value of the 3-millimeter thick portion of the three-stage plate, which is obtained by subjecting the polycarbonate-based resin composition of the present invention to injection molding under the conditions of a cylinder temperature of 280° C., a mold temperature of 80° C., and a cycle time of 31 seconds, is preferably 3.5 or less, more preferably 3.0 or less, still more preferably 2.5 or less from the viewpoint of further suppressing the yellow tinge of the molded article to be obtained. The lower limit of the YI value is not particularly limited because the YI value is preferably as low as possible from the viewpoint of further suppressing the yellow tinge. However, the YI value is, for example, 0.1 or more, and may be 0.5 or more.

In addition, the YI value of the 5-millimeter thick plate, which is obtained by subjecting the polycarbonate-based resin composition of the present invention to injection molding under the conditions of a cylinder temperature of 280° C., a mold temperature of 80° C., and a cycle time of 53 seconds, is preferably 6.0 or less, more preferably 5.5 or less, still more preferably 5.0 or less, still more preferably 4.5 or less. The lower limit of the YI value is not particularly limited because the YI value is preferably as low as possible from the viewpoint of further suppressing the yellow tinge. However, the YI value is, for example, 0.1 or more, and may be 0.5 or more.

<Haze>

The haze of the 3-millimeter thick portion of the three-stage plate, which is obtained by subjecting the polycarbonate-based resin composition of the present invention to injection molding under the conditions of a cylinder temperature of 280° C., a mold temperature of 80° C., and a cycle time of 31 seconds, is preferably 3.0% or less, more preferably 2.0% or less, still more preferably 1.5% or less, still more preferably 1.2% or less from the viewpoint of further suppressing the opacity of the molded article to be obtained. The lower limit of the haze is not particularly limited because the haze is preferably as low as possible from the viewpoint of further suppressing the opacity. However, the haze is, for example, 0.01% or more, and may be 0.10% or more.

In addition, the haze of the 5-millimeter thick plate, which is obtained by subjecting the polycarbonate-based resin composition of the present invention to injection molding under the conditions of a cylinder temperature of 280° C., a mold temperature of 80° C., and a cycle time of 53 seconds, is preferably 4.0% or less, more preferably 3.0% or less, still more preferably 2.0% or less, still more preferably 1.5% or less from the viewpoint of further suppressing the opacity of the molded article to be obtained. The lower limit of the haze is not particularly limited because the haze is preferably as low as possible from the viewpoint of further suppressing the opacity. However, the haze is, for example, 0.01% or more, and may be 0.10% or more.

The haze may be measured in conformity with JIS K 7375:2008.

<Thin-Wall Flame Retardancy>

A 1.5-millimeter thick plate, which is obtained by subjecting the polycarbonate-based resin composition of the present invention to injection molding under the conditions of a cylinder temperature of 280° C., a mold temperature of 80° C., and a cycle time of 18 seconds, preferably has a flame retardancy of V-0 under a UL94 standard from the viewpoint of further improving the thin-wall flame retardancy. That is, the polycarbonate-based resin composition of the present invention can achieve an extremely high degree of thin-wall flame retardancy.

2. Method of Producing Polycarbonate-Based Resin Composition

The polycarbonate-based resin composition of the present invention may be obtained by blending and mixing the above-mentioned components, and kneading the mixture.

A mixing or kneading method is not particularly limited, and an example thereof is a method using, for example, a ribbon blender, a Henschel mixer, a Banbury mixer, a drum tumbler, a single-screw extruder, a twin-screw extruder, a cokneader, or a multi-screw extruder. In addition, a heating temperature at the time of the kneading is selected from the range of typically from 240° C. to 330° C., preferably from 250° C. to 320° C.

In this case, the blending is preferably performed so that the branching ratio of the polycarbonate-based resin (A) may be 0.30 mol % or more and 3.0 mol % or less. The branched polycarbonate-based resin (A-1) and the aromatic polycarbonate-based resin (A-2) except the branched polycarbonate-based resin (A-1) may be blended so that the branching ratio of the polycarbonate-based resin (A) may be preferably 0.35 mol % or more, more preferably 0.40 mol % or more, still more preferably 0.43 mol % or more, still more preferably 0.45 mol % or more from the viewpoint of further improving the thin-wall flame retardancy. The resins may be blended so that the branching ratio may be preferably 2.5 mol % or less, more preferably 2.0 mol % or less, still more preferably 1.5 mol % or less, still more preferably 1.0 mol % or less from the viewpoint of obtaining satisfactory thin-wall flame retardancy, satisfactory optical transparency, a satisfactory mechanical characteristic, satisfactory moldability, and satisfactory fluidity. A component to be incorporated except the polycarbonate-based resin (A) may be added after having been melt-kneaded together with the polycarbonate-based resin or any other thermoplastic resin in advance, that is, as a master batch.

3. Molded Article

The polycarbonate-based resin composition of the present invention is suitably used for forming a molded article. That is, the polycarbonate-based resin composition of the present invention is preferably used for a molded article, is more preferably used for an optically transparent molded article, and is still more preferably used for a transparent molded article.

A molded article of the present invention includes the polycarbonate-based resin composition of the present invention.

That is, the molded article of the present invention may be obtained by molding the polycarbonate-based resin composition of the present invention.

Various conventionally known molding methods may each be used as a molding method, and examples thereof include an injection molding method, an injection compression molding method, an extrusion molding method, a profile extrusion molding method, a blow molding method, a press molding method, a vacuum molding method, and an expansion molding method.

A component to be incorporated except the polycarbonate-based resin (A) may be added after having been melt-kneaded together with the polycarbonate-based resin (A) or any other thermoplastic resin in advance, that is, as a master batch.

It is preferred that the polycarbonate-based resin composition be pelletized, and molding be performed by using the pellet. A general molding method, such as an injection molding method, an injection compression molding method, or an extrusion molding method, or a special molding method, such as a gas-assisted molding method or a profile extrusion molding method, may be used. Thus, various molded articles can be produced.

When the molded article of the present invention is used as an appearance member, a molding technology for an improvement in appearance, such as a heat cycle molding method, a high-temperature mold, or a heat-insulating mold, is preferably used.

The molded article of the present invention can be suitably used as various optical molded articles, for example, lighting equipment covers each made of a resin, such as a lighting cover and a display cover, and a lens because the molded article is excellent in, for example, flame retardancy, optical transparency, and color tone.

In addition, the molded article of the present invention is preferably an optically transparent molded article, and is more preferably used for a transparent molded article.

EXAMPLES

The present invention is described in more detail below by way of Examples, but the present invention is not limited to these Examples.

1. Production of Branched Polycarbonate-Based Resin

Production Example 1 (Production of Branched PC1: 0.90 mol % of THPE)

(Polycarbonate Oligomer (i) Synthesis Step)

Sodium dithionite was added in an amount of 2,000 ppm by mass with respect to bisphenol A (BPA) to be dissolved later to 5.6 wt % aqueous sodium hydroxide, and BPA was dissolved in the mixture so that the concentration of BPA became 13.5 wt %. Thus, a solution of BPA in aqueous sodium hydroxide was prepared.

Sodium dithionite was added in an amount of 2,000 ppm by mass with respect to 1,1,1-tris(4-hydroxyphenylethane) (THPE) to be dissolved later to 5.6 wt % aqueous sodium hydroxide, and THPE was dissolved in the mixture so that the concentration of THPE became 11.3 wt %. Thus, a solution of THPE in aqueous sodium hydroxide was prepared.

The solution of BPA in aqueous sodium hydroxide, the solution of THPE in aqueous sodium hydroxide, methylene chloride, and phosgene were continuously passed through a tubular reactor having an inner diameter of 6 mm and a tube length of 30 m at flow rates of 42 L/hr, 0.87 L/hr, 15 L/hr, and 4.0 kg/hr, respectively. The tubular reactor had a jacket portion and the temperature of the reaction liquid was kept at 40° C. or less by passing cooling water through the jacket.

The reaction liquid that had exited the tubular reactor was continuously introduced into a baffled vessel-type reactor including a sweptback blade and having an internal volume of 40 L. 2.8 L/hr of the solution of BPA in aqueous sodium hydroxide, 0.07 L/hr of 25 wt % aqueous sodium hydroxide, 17 L/hr of water, 0.69 L/hr of a 1 wt % aqueous solution of triethylamine, and 4.6 L/hr of a solution of p-tert-butylphenol (PTBP) in methylene chloride (concentration: 4.0 wt %) were further added to the reactor to perform a reaction.

An aqueous phase was separated and removed by continuously taking out the reaction liquid overflowing the vessel-type reactor and leaving the reaction liquid at rest. Then, a methylene chloride phase was collected.

The resultant polycarbonate oligomer had a concentration of 330 g/L and a chloroformate group concentration of 0.72 mol/L.

(Step of Producing Polycarbonate-Based Resin)

15 L of the previously obtained polycarbonate oligomer solution, 10.2 L of methylene chloride, and 2.8 mL of triethylamine were loaded into a 50-liter vessel-type reactor including a baffle board, a paddle-type stirring blade, and a cooling jacket, and were mixed with each other.

A solution of BPA in aqueous sodium hydroxide (prepared by dissolving 1,166 g of BPA in an aqueous solution prepared by dissolving 639 g of NaOH and 2.3 g of sodium dithionite in 9.3 L of water) was added to the mixed liquid to perform a polymerization reaction for 60 minutes.

10 L of methylene chloride was added to the resultant for dilution and the mixture was stirred for 10 minutes. After that, the mixture was separated into an organic phase containing a polycarbonate resin, and an aqueous phase containing excess amounts of BPA and NaOH, and the organic phase was isolated.

The solution of the resultant polycarbonate in methylene chloride was sequentially washed with 0.03 mol/L aqueous sodium hydroxide and 0.2 N hydrochloric acid in amounts of 15 vol % each with respect to the solution. Next, the solution was repeatedly washed with pure water until an electric conductivity in an aqueous phase after the washing became 0.01 μS/m or less. The solution of the polycarbonate-based resin in methylene chloride obtained by the washing was concentrated and pulverized, and the flake was dried under reduced pressure at 120° C.

The branching ratio of the resultant branched PC1 determined by $^{1}$H-NMR was 0.90 mol %, and the viscosity-average molecular weight Mv thereof measured in conformity with ISO 1628-4 (1999) was 22,800.

2. Measurement of Physical Properties of Polycarbonate-Based Resin (A)

(1) Branching Ratio of Polycarbonate-Based Resin (A)

The branching ratio of a polycarbonate-based resin (A) was determined through $^{1}$H-NMR measurement. The branching ratio was determined as "number of moles of structural unit derived from branching agent/total number of moles of (structural unit derived from dihydric phenol+structural unit derived from branching agent+terminal unit)×100" (represented in the unit of mol %).

(2) Viscosity-Average Molecular Weight of Polycarbonate-Based Resin (A)

The viscosity-average molecular weight Mv of the polycarbonate-based resin (A) was calculated from the following Schnell's equation through the measurement of the limiting viscosity [η] of a methylene chloride solution (unit of concentration: g/L) at 20° C. with an Ubbelohde-type viscosity tube.

Values each obtained by rounding an actual value calculated from the measured limiting viscosity to the nearest multiple of 1,000 are shown as the viscosity-average molecular weights Mv in Tables 1 to 5.

$$[\eta]=1.23\times10^{-5}\times Mv^{0.83}$$

3. Used Raw Materials (Resins and Additives)

The following raw materials were used in Examples and Comparative Examples.

(A) Polycarbonate (PC)-Based Resin (A-1) Branched Polycarbonate-Based Resin (Branched PC)

Branched PC1: Production Example 1 described above (A-2): Aromatic Polycarbonate-Based Resin PC1: TARFLON FN1700 [manufactured by Idemitsu Kosan Co., Ltd., homopolycarbonate produced from bisphenol A, viscosity-average molecular weight=17,700]

PC2: TARFLON FN2200 [manufactured by Idemitsu Kosan Co., Ltd., homopolycarbonate produced from bisphenol A, viscosity-average molecular weight=21,300]

PC3: TARFLON FN2500 [manufactured by Idemitsu Kosan Co., Ltd., homopolycarbonate produced from bisphenol A, viscosity-average molecular weight=23,500]

(B): Perfluoroalkylsulfonimide

PFSI1: EF-N112 [manufactured by Mitsubishi Materials Electronic Chemicals Co., Ltd., potassium bis(trifluoromethanesulfonyl)imide]

PFSI2: EF-N115 [manufactured by Mitsubishi Materials Electronic Chemicals Co., Ltd., lithium bis(trifluoromethanesulfonyl)imide]

(B'): Flame Retardant Except Perfluoroalkylsulfonimide (B) Represented by Formula (1)

Flame retardant 1: KFBS [manufactured by Mitsubishi Materials Electronic Chemicals Co., Ltd., potassium nonafluorobutanesulfonate]

Flame retardant 2: KSS [manufactured by Metropolitan Eximchem Pvt. Ltd., potassium diphenylsulfone-3-sulfonate]

Flame retardant 3: EF-N442 [manufactured by Mitsubishi Materials Electronic Chemicals Co., Ltd., potassium N,N-bis(nonafluorobutanesulfonyl)imide]

Flame retardant 4: EF-N444 [manufactured by Mitsubishi Materials Electronic Chemicals Co., Ltd., ammonium bis(nonafluorobutanesulfonyl)imide]

Flame retardant 5: P12N111 [manufactured by Mitsubishi Materials Corporation, 1-ethyl-1-methylpyrrolidinium bis(trifluoromethanesulfonyl)imide]

Flame retardant 6: TEATFSI [manufactured by Mitsubishi Materials Corporation, tetraethylammonium bis(trifluoromethanesulfonyl)imide]

Flame retardant 7: MTOATFSI [manufactured by Mitsubishi Materials Corporation, methyltrioctylammonium bis(trifluoromethanesulfonyl)imide]

Flame retardant 8: EMIN111 [manufactured by Mitsubishi Materials Corporation, 1-ethyl-3-methylimidazolium bis(trifluoromethanesulfonyl)imide]

(C) Antioxidant

Antioxidant 1: Irgafos 168 [manufactured by BASF Japan Ltd., tris(2,4-di-tert butylphenyl) phosphite, abbreviated as "Irg168" in the table]

Antioxidant 2: Irganox 1076 [(manufactured by BASF Japan Ltd., octadecyl-3-(3,5-di-tert butyl-4-hydroxyphenyl) propionate, abbreviated as "Irg1076" in the table)]

Antioxidant 3: Doverphos S-9228PC [manufactured by Dover Chemical Corporation, bis(2,4-dicumylphenyl) pentaerythritol diphosphite, abbreviated as "Doverphos" in the table]

(D) Release Agent

Release agent 1: EW-440A [manufactured by Riken Vitamin Co., Ltd., pentaerythritol tetrastearate]

Release agent 2: S-100A [manufactured by Riken Vitamin Co., Ltd., glycerin monostearate]

(E) Silicone Compound

Silicone 1: KR-511 [manufactured by Shin-Etsu Chemical Co., Ltd., reactive silicone compound containing a phenyl group, a methoxy group, and a vinyl group, refractive index=1.518]

Silicone 2: TSF437 [manufactured by Momentive Performance Materials Inc., polydimethyldiphenylsiloxane, refractive index=1.499]

Silicone 3: SFR320 [manufactured by Momentive Performance Materials Inc., polymethylphenylsiloxane, refractive index=1.536]

4. Examples and Comparative Examples

(4.1) Examples 1 to 17 and Comparative Examples 1 to 16

(1) Production of Evaluation Pellet

Respective components were mixed at ratios shown in Tables 1 to 4, and each of the mixtures was supplied to a vented twin-screw extrusion molding machine [manufactured by Toshiba Machine Co., Ltd.: TEM-35], and was melt-kneaded at a barrel temperature of from 270° C. to 280° C., a screw revolution number of 250 rpm, and an ejection amount of 25 kg/hr. Thus, each evaluation pellet sample was obtained.

Herein, the blending amounts of the respective components shown in Tables 1 to 4 are each represented in the unit of part(s) by mass.

(2) Production of Evaluation Molded Article (Test Piece for Thin-Wall Flame Retardancy Evaluation)

The evaluation pellet obtained in each of Examples and Comparative Examples was dried at 120° C. for 5 hours, and was then subjected to injection molding with an injection molding machine [manufactured by Toshiba Machine Co., Ltd., EC75PNII] under the conditions of a cylinder temperature of 280° C., a mold temperature of 80° C., and a cycle time of 18 seconds to produce a plate-shaped test piece measuring 125 mm long by 13 mm wide by 1.5 mm thick.

(Three-Stage Plate for Measurement of Total Light Transmittance, Haze, and YI Value)

The evaluation pellet obtained in each of Examples and Comparative Examples was dried at 120° C. for 5 hours, and was then subjected to injection molding with an injection molding machine [manufactured by Niigata Machine Techno Co., Ltd., MD50X] under the conditions of a cylinder temperature of 280° C., a mold temperature of 80° C., and a cycle time of 31 seconds to produce a three-stage plate measuring 90 mm×50 mm (3-millimeter thick portion: 45 mm×50 mm, 2-millimeter thick portion: 22.5 mm×50 mm, 1-millimeter thick portion: 22.5 mm×50 mm).

(5-Millimeter Thick Plate for Measurement of Total Light Transmittance, Haze, and YI Value)

The evaluation pellet obtained in each of Examples and Comparative Examples was dried at 120° C. for 5 hours, and was then subjected to injection molding with an injection molding machine [manufactured by Nissei Plastic Industrial Co., Ltd., ES1000] under the conditions of a cylinder temperature of 280° C., a mold temperature of 80° C., and a cycle time of 53 seconds to produce a 5-millimeter thick plate measuring 90 mm×50 mm.

(3) Evaluation

The following respective evaluations were performed by using the evaluation molded articles obtained in the section (2). The results are shown in Tables 1 to 4.

Thin-Wall Flame Retardancy

Each of the 1.5-millimeter thick plate-shaped test pieces produced above was subjected to a vertical flame test in conformity with a UL94 standard. The test piece was evaluated for its flame retardancy by being classified into a rank V-0, V-1, or V-2 on the basis of the result of the test. The test piece that did not reach any of the ranks was represented by V-out.

The UL94 standard is a method of evaluating flame retardancy from an afterflame time after the flame of a burner has been brought into contact with a test piece having a predetermined size, which has been vertically held, for 10 seconds.

Total Light Transmittance

The total light transmittances of the 3-millimeter thick portions of the three-stage plates and the 5-millimeter thick plates, the plates having been produced above, were measured. The total light transmittances were measured with a tester NDH 5000 manufactured by Nippon Denshoku Industries Co., Ltd. in conformity with JIS K 7375:2008.

Haze

The hazes of the 3-millimeter thick portions of the three-stage plates and the 5-millimeter thick plates, the plates having been produced above, were measured. The hazes were measured with a tester NDH 5000 manufactured by Nippon Denshoku Industries Co., Ltd. in conformity with JIS K 7375:2008.

YI Value

The YI values of the 3-millimeter thick portions of the three-stage plates and the 5-millimeter thick plates, the plates having been produced above, were measured with a tester SE 2000 manufactured by Nippon Denshoku Industries Co., Ltd. under the conditions of a C light source and a two-degree field of view.

TABLE 1

| | | | Exam-ple 1 | Exam-ple 2 | Exam-ple 3 | Exam-ple 4 | Exam-ple 5 | Exam-ple 6 | Exam-lpe 7 | Exam-ple 8 | Exam-ple 9 |
|---|---|---|---|---|---|---|---|---|---|---|---|
| Polycarbonate-based resin (A) | PC1 | part(s) by mass | 30 | 30 | 30 | 30 | 30 | 30 | 30 | 30 | 30 |
| | Branched PC1 | part(s) by mass | 70 | 70 | 70 | 70 | 70 | 70 | 70 | 70 | 70 |
| | Viscosity-average molecular weight Mv | — | 21,000 | 21,000 | 21,000 | 21,000 | 21,000 | 21,000 | 22,000 | 21,000 | 20,000 |
| | Branching ratio | mol % | 0.63 | 0.63 | 0.63 | 0.63 | 0.63 | 0.63 | 0.63 | 0.63 | 0.63 |
| Perfluoroalkyl-sulfonimide (B) | PFSI1 | part(s) by mass | 0.06 | 0.08 | 0.08 | 0.10 | 0.15 | 0.20 | 0.30 | 0.50 | 1.0 |
| Antioxidant (C) | Antioxidant 1 | part(s) by mass | 0.05 | 0.05 | 0.05 | 0.05 | 0.05 | 0.05 | 0.05 | 0.05 | 0.05 |
| | Antioxidant 2 | part(s) by mass | 0.1 | 0.1 | 0.1 | 0.1 | 0.1 | 0.1 | 0.1 | 0.1 | 0.1 |
| Release agent (D) | Release agent 1 | part(s) by mass | 0.3 | 0.3 | 0.3 | 0.3 | 0.3 | 0.3 | 0.3 | 0.3 | 0.3 |
| Silicone compound (E) | Silicone 1 | part(s) by mass | | | 0.3 | | | | | | |
| Evaluation result | Thin-wall flame retardancy (1.5 mmt) | — | V-0 | V-0 | V-0 | V-0 | V-0 | V-0 | V-0 | V-0 | V-0 |
| | Total light transmittance (3 mmt) | % | 89.7 | 89.7 | 89.7 | 89.8 | 89.7 | 89.9 | 89.9 | 89.9 | 89.9 |
| | Total light transmittance (5 mmt) | % | 89.3 | 89.3 | 89.5 | 89.4 | 89.3 | 89.3 | 89.4 | 89.6 | 89.8 |
| | Haze (3 mmt) | % | 0.53 | 0.40 | 0.37 | 0.37 | 0.33 | 0.23 | 0.33 | 0.27 | 0.23 |
| | Haze (5 mmt) | % | 0.76 | 0.70 | 0.67 | 0.67 | 0.63 | 0.55 | 0.64 | 0.53 | 0.40 |
| | YI value (3 mmt) | — | 1.9 | 2.0 | 1.9 | 1.8 | 1.9 | 1.5 | 1.6 | 1.6 | 1.8 |
| | YI value (5 mmt) | — | 2.8 | 2.8 | 2.4 | 2.7 | 2.9 | 2.4 | 2.3 | 2.4 | 1.8 |

TABLE 2

| | | | Example 10 | Example 11 | Example 12 | Example 13 | Example 14 | Example 15 | Example 16 | Example 17 |
|---|---|---|---|---|---|---|---|---|---|---|
| Polycarbonate-based resin (A) | PC1 | part(s) by mass | 30 | 30 | | 20 | 50 | | | 30 |
| | PC3 | part(s) by mass | | | | | | 30 | 50 | |
| | Branched PC1 | part(s) by mass | 70 | 70 | 100 | 80 | 50 | 70 | 50 | 70 |
| | Viscosity-average molecular weight Mv | — | 21,000 | 21,000 | 22,000 | 21,000 | 20,000 | 23,000 | 23,000 | 21,000 |
| | Branching ratio | mol % | 0.63 | 0.63 | 0.90 | 0.72 | 0.45 | 0.63 | 0.45 | 0.63 |
| Perfluoroalkyl-sulfonimide (B) | PFSI1 | part(s) by mass | | | 0.08 | 0.08 | 0.08 | 0.08 | 0.08 | |
| | PFSI2 | part(s) by mass | 0.06 | 0.10 | | | | | | 0.08 |
| Antioxidant (C) | Antioxidant 1 | part(s) by mass | 0.05 | 0.05 | 0.05 | 0.05 | 0.05 | 0.05 | 0.05 | 0.03 |
| | Antioxidant 2 | part(s) by mass | 0.1 | 0.1 | 0.1 | 0.1 | 0.1 | 0.1 | 0.1 | |
| | Antioxidant 3 | part(s) by mass | | | | | | | | 0.05 |
| Release agent (D) | Release agent 1 | part(s) by mass | 0.3 | 0.3 | 0.3 | 0.3 | 0.3 | 0.3 | 0.3 | |
| | Release agent 2 | part(s) by mass | | | | | | | | 0.03 |
| Silicone compound (E) | Silicone 1 | part(s) by mass | | | | | | | | 0.3 |
| Evaluation result | Thin-wall flame retardancy (1.5 mmt) | — | V-0 | V-0 | V-0 | V-0 | V-0 | V-0 | V-0 | V-0 |
| | Total light transmittance (3 mmt) | % | 89.6 | 89.6 | 89.9 | 89.9 | 89.9 | 89.9 | 89.9 | 89.4 |

TABLE 2-continued

| | | Example 10 | Example 11 | Example 12 | Example 13 | Example 14 | Example 15 | Example 16 | Example 17 |
|---|---|---|---|---|---|---|---|---|---|
| Total light transmittance (5 mmt) | % | 89.2 | 89.2 | 89.3 | 89.4 | 89.4 | 89.2 | 89.2 | 88.9 |
| Haze (3 mmt) | % | 0.30 | 0.23 | 0.53 | 0.23 | 0.17 | 0.20 | 0.13 | 0.91 |
| Haze (5 mmt) | % | 0.61 | 0.52 | 0.74 | 0.55 | 0.48 | 0.50 | 0.41 | 1.22 |
| YI value (3 mmt) | — | 2.2 | 2.1 | 1.8 | 1.5 | 1.5 | 1.6 | 1.5 | — |
| YI value (5 mmt) | — | 3.5 | 3.1 | 3.9 | 3.5 | 3.2 | 3.5 | 3.6 | — |

TABLE 3

| | | | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|---|
| Polycarbonate-based resin (A) | PC1 | part(s) by mass | 30 | 70 | 30 | 30 | 30 | 20 | 20 | 20 |
| | Branched PC1 | part(s) by mass | 70 | 30 | 70 | 70 | 70 | 80 | 80 | 80 |
| | Viscosity-average molecular weight Mv | — | 21,000 | 19,000 | 21,000 | 21,000 | 21,000 | 21,000 | 21,000 | 21,000 |
| | Branching ratio | mol % | 0.63 | 0.27 | 0.63 | 0.63 | 0.63 | 0.72 | 0.72 | 0.72 |
| Perfluoroalkyl-sulfonimide (B) | PFSI1 | part(s) by mass | 0.04 | 0.08 | | | | | | |
| | PFSI2 | part(s) by mass | | | 0.04 | | | | | |
| Flame retardant (B') | Flame retardant 1 | part(s) by mass | | | | 0.08 | 0.15 | | | |
| | Flame retardant 2 | part(s) by mass | | | | | | 0.15 | 0.30 | 0.40 |
| Antioxidant (C) | Antioxidant 1 | part(s) by mass | 0.05 | 0.05 | 0.05 | 0.05 | 0.05 | 0.05 | 0.05 | 0.05 |
| | Antioxidant 2 | part(s) by mass | 0.1 | 0.1 | 0.1 | 0.1 | 0.1 | 0.1 | 0.1 | 0.1 |
| Release agent (D) | Release agent 1 | part(s) by mass | 0.3 | 0.3 | 0.3 | 0.3 | 0.3 | 0.3 | 0.3 | 0.3 |
| Silicone compound (E) | Silicone 1 | part(s) by mass | | | | 0.3 | | 0.3 | 0.3 | 0.3 |
| Evaluation result | Thin-wall flame retardancy (1.5 mmt) | — | V-1 | V-2 | V-2 | V-0 | V-0 | V-1 | V-2 | V-2 |
| | Total light transmittance (3 mmt) | % | 89.7 | 89.9 | 89.6 | 89.6 | 87.3 | 89.2 | 89.0 | 89.0 |
| | Total light transmittance (5 mmt) | % | 89.3 | 89.3 | 89.1 | 85.8 | 60.2 | 88.4 | 88.2 | 88.1 |
| | Haze (3 mmt) | % | 0.80 | 0.23 | 0.30 | 0.47 | 9.37 | 1.15 | 1.75 | 2.25 |
| | Haze (5 mmt) | % | 1.43 | 0.54 | 0.50 | 5.57 | 68.73 | 1.70 | 2.92 | 3.80 |
| | YI value (3 mmt) | — | 2.1 | 1.5 | 2.1 | 2.1 | 10.8 | 3.0 | 3.7 | 4.1 |
| | YI value (5 mmt) | — | 2.9 | 2.4 | 3.1 | 12.1 | 85.6 | 4.7 | 6.4 | 6.7 |

TABLE 4

| | | | Comparative Example 9 | Comparative Example 10 | Comparative Example 11 | Comparative Example 12 | Comparative Example 13 | Comparative Example 14 | Comparative Example 15 | Comparative Example 16 |
|---|---|---|---|---|---|---|---|---|---|---|
| Polycarbonate-based resin (A) | PC1 | part(s) by mass | 30 | 30 | 30 | 30 | 30 | 30 | | |
| | PC2 | part(s) by mass | | | | | | | 100 | 100 |
| | Branched PC1 | part(s) by mass | 70 | 70 | 70 | 70 | 70 | 70 | | |
| | Viscosity-average | — | 21,000 | 21,000 | 21,000 | 21,000 | 21,000 | 21,000 | 21,000 | 21,000 |

TABLE 4-continued

| | | | Comparative Example 9 | Comparative Example 10 | Comparative Example 11 | Comparative Example 12 | Comparative Example 13 | Comparative Example 14 | Comparative Example 15 | Comparative Example 16 |
|---|---|---|---|---|---|---|---|---|---|---|
| | molecular weight Mv | | | | | | | | | |
| | Branching ratio | mol % | 0.63 | 0.63 | 0.63 | 0.63 | 0.63 | 0.63 | 0 | 0 |
| Perfluoroalkyl-sulfonimide (B) | PFSI1 | part(s) by mass | | | | | | | 0.15 | 0.15 |
| Flame retardant (B') | Flame retardant 3 | part(s) by mass | 0.08 | | | | | | | |
| | Flame retardant 4 | part(s) by mass | | 0.08 | | | | | | |
| | Flame retardant 5 | part(s) by mass | | | 0.08 | | | | | |
| | Flame retardant 6 | part(s) by mass | | | | 0.08 | | | | |
| | Flame retardant 7 | part(s) by mass | | | | | 0.08 | | | |
| | Flame retardant 8 | part(s) by mass | | | | | | 0.08 | | |
| Antioxidant (C) | Antioxidant 1 | part(s) by mass | 0.03 | 0.03 | 0.03 | 0.03 | 0.03 | 0.03 | 0.05 | |
| | Antioxidant 3 | part(s) by mass | 0.05 | 0.05 | 0.05 | 0.05 | 0.05 | 0.05 | | |
| Release agent (D) | Release agent 1 | part(s) by mass | | | | | | | 0.3 | 0.3 |
| | Release agent 2 | part(s) by mass | 0.03 | 0.03 | 0.03 | 0.03 | 0.03 | 0.03 | | |
| Silicone compound (E) | Silicone 1 | part(s) by mass | 0.3 | 0.3 | 0.3 | 0.3 | 0.3 | 0.3 | | |
| Evaluation result | Thin-wall flame retardancy (1.5 mmt) | — | V-OUT | V-OUT | V-OUT | V-OUT | V-OUT | V-OUT | V-2 | V-2 |
| | Total light transmittance (3 mmt) | % | 89.9 | 89.3 | 90.0 | 90.1 | 90.0 | 90.1 | 89.7 | 89.7 |
| | Total light transmittance (5 mmt) | % | 88.3 | 88.1 | 89.0 | 88.9 | 89.0 | 88.8 | 89.6 | 89.4 |
| | Haze (3 mmt) | % | 0.92 | 1.22 | 1.27 | 0.81 | 1.22 | 0.69 | 0.75 | 0.27 |
| | Haze (5 mmt) | % | 1.21 | 1.51 | 1.56 | 1.11 | 1.49 | 1.01 | 0.60 | 0.37 |
| | YI value (3 mmt) | — | — | — | — | — | — | — | 1.7 | 2.3 |
| | YI value (5 mmt) | — | — | — | — | — | — | — | 2.4 | 3.2 |

(4.2) Examples 18 to 21

(1) Production of Evaluation Pellet

Evaluation pellet samples were each obtained in the same manner as in Example 1 by mixing the respective components at a ratio shown in Table 5.

(2) Production of Evaluation Molded Article 1.5-Millimeter thick plate-shaped test pieces and 5-millimeter thick plates were each produced in the same manner as in Example 1.

Further, the evaluation pellet obtained in each of Examples was dried at 120° C. for 5 hours, and was then subjected to injection molding with an injection molding machine [manufactured by Toshiba Machine Co., Ltd., EC75PNII] under the conditions of a cylinder temperature of 280° C., a mold temperature of 40° C., and a cycle time of 18 seconds to mold a plate-shaped test piece measuring 125 mm long by 13 mm wide by 1.2 mm thick.

(3) Evaluation

Thin-Wall Flame Retardancy

The 1.5-millimeter thick plate-shaped test pieces were each evaluated for its thin-wall flame retardancy in the same manner as in Example 1.

Further, the 1.2-millimeter thick plate-shaped test pieces produced above were each evaluated for its thin-wall flame retardancy in the same manner as in the 1.5-millimeter thick plate-shaped test pieces.

Total Light Transmittance, Haze, and YI Value

The total light transmittances, hazes, and YI values of the 5-millimeter thick plates were measured in the same manner as in Example 1.

TABLE 5

| | | | Example 18 | Example 19 | Example 20 | Example 21 |
|---|---|---|---|---|---|---|
| Polycarbonate-based resin (A) | PC1 | part(s) by mass | 30 | 30 | 30 | 30 |
| | Branched PC1 | part(s) by mass | 70 | 70 | 70 | 70 |

TABLE 5-continued

| | | | Example 18 | Example 19 | Example 20 | Example 21 |
|---|---|---|---|---|---|---|
| | Viscosity-average molecular weight Mv | — | 20,000 | 20,000 | 21,000 | 20,000 |
| | Branching ratio | mol % | 0.63 | 0.63 | 0.63 | 0.63 |
| Perfluoroalkyl-sulfonimide (B) | PFSI1 | part(s) by mass | 0.08 | 0.08 | 0.08 | 0.08 |
| Antioxidant (C) | Antioxidant 1 | part(s) by mass | 0.05 | 0.05 | 0.05 | 0.05 |
| | Antioxidant 2 | part(s) by mass | 0.1 | 0.1 | 0.1 | 0.1 |
| Release agent (D) | Release agent 1 | part(s) by mass | 0.3 | 0.3 | 0.3 | 0.3 |
| Silicone compound (E) | Silicone 2 | part(s) by mass | | 1.0 | | |
| | Silicone 3 | part(s) by mass | | | 0.5 | 1.0 |
| Evaluation result | Thin-wall flame retardancy (1.5 mmt) | — | V-0 | V-0 | V-0 | V-0 |
| | Thin-wall flame retardancy (1.2 mmt) | | V-2 | V-0 | V-1 | V-0 |
| | Total light transmittance (5 mmt) | % | 89.5 | 89.7 | 89.7 | 89.7 |
| | Haze (5 mmt) | % | 0.53 | 0.60 | 0.50 | 0.50 |
| | YI value (5 mmt) | — | 2.8 | 2.1 | 2.2 | 2.1 |

It is found from Tables 1 to 5 that each of the molded articles formed from the polycarbonate-based resin compositions of Examples has a low YI value and a low haze, and is hence suppressed from causing a yellow tinge and opacity. Further, it is found that even under such a thin-wall condition that each of the molded articles of Examples has a thickness of 1.5 mm or 1.2 mm, the molded article has a flame retardancy of V-0 under the UL94 standard, and hence has satisfactory thin-wall flame retardancy. It can be understood from the foregoing that the polycarbonate-based resin composition of the present invention can provide a molded article, which is suppressed from causing a yellow tinge and opacity, and which is improved in thin-wall flame retardancy and optical transparency.

Some embodiments and/or Examples of the present invention are described in detail above, but a person skilled in the art could easily make various modifications to these illustrative embodiments and/or Examples without substantially departing from the novel teachings and effects of the present invention. Accordingly, those various modifications are encompassed in the scope of the present invention.

The invention claimed is:

1. A polycarbonate-based resin composition, comprising:

a polycarbonate-based resin (A);

a perfluoroalkylsulfonimide (B) represented by the following formula (1), and an antioxidant (C) comprising at least one antioxidant selected from a phosphorus-based antioxidant and a phenol-based antioxidant, wherein a content of the antioxidant (C) is 0.03 part by mass or more and 0.50 part by mass or less with respect to 100 parts by mass of the polycarbonate-based resin (A), the polycarbonate-based resin (A) has a branching ratio of 0.30 mol % or more and 3.0 mol % or less, which is calculated from the expression "(number of moles of structural unit derived from branching agent)/(number of moles of structural unit derived from dihydric phenol+number of moles of structural unit derived from branching agent+number of moles of terminal unit)×100,"

wherein a content of the perfluoroalkylsulfonimide (B) is 0.05 part by mass or more and 2.0 parts by mass or less with respect to 100 parts by mass of the polycarbonate-based resin (A):

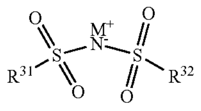

(1)

wherein in the formula (1), $R^{31}$ represents a perfluoroalkyl group having 1 to 3 carbon atoms, $R^{32}$ represents a perfluoroalkyl group having 1 to 4 carbon atoms, and $M^+$ represents at least one kind of monovalent cation selected from the group consisting of: a lithium ion; a sodium ion; and a potassium ion, and wherein the phosphorus-based antioxidant is selected from the group consisting of triphenyl phosphite, diphenyl nonyl phosphite, diphenyl (2-ethylhexyl) phosphite, tris(2,4-di-tertbutylphenyl) phosphite, tris(nonylphenyl) phosphite, diphenyl isooctyl phosphite, 2,2'-methylenebis(4,6-di-tert-butylphenyl) octyl phosphite, diphenyl isodecyl phosphite, diphenyl mono(tridecyl)phosphite, phenyl diisodecyl phosphite, phenyl di(tridecyl) phosphite, tris(2-ethylhexyl) phosphite, tris(isodecyl) phosphite, tris(tridecyl) phosphite, dibutyl hydrogen phosphite, trilauryl trithiophosphite, tetrakis(2,4-di-tert-butylphenyl)-4,4'-biphenylene diphosphonite, 4,4'-isopropylidenediphenol dodecyl phosphite, 4,4'-isopropylidenediphenol tridecyl phosphite, 4,4'-isopropylidenediphenol tetradecyl phosphite, 4,4'-isopropylidenediphenol pentadecyl phosphite, 4,4'-butylidenebis(3-methyl-6-tert-butylphenyl)ditridecyl phosphite, 1,1,3-tris(2-methyl-4-di-tridecylphosphite-5-tert-butylphenyl)butane, 3,4,5,6-dibenzo-1,2-oxaphosphane, triphenylphosphine, diphenylbutylphosphine, diphenyloctadecylphosphine, tris(p-tolyl) phosphine, tris(p-nonylphenyl)phosphine, tris(naphthyl)phosphine, diphenyl(hydroxymethyl) phosphine, diphenyl(acetoxymethyl)phosphine, diphenyl(β-ethylcarboxyethyl)phosphine, tris(p-chlorophenyl)phosphine, tris(p-fluorophenyl)phosphine, benzyldiphenylphosphine, diphenyl(β-cyanoethyl) phosphine, diphenyl(p-hydroxyphenyl)phosphine, diphenyl(1,4-dihydroxyphenyl)-2-phosphine, and phenylnaphthylbenzylphosphine.

2. The polycarbonate-based resin composition according to claim 1, wherein the polycarbonate-based resin (A) contains a branched polycarbonate-based resin (A-1) and an aromatic polycarbonate-based resin (A-2) except the branched polycarbonate-based resin (A-1).

3. The polycarbonate-based resin composition according to claim 2, wherein the branched polycarbonate-based resin (A-1) has a repeating unit represented by the following formula (I) and a branched structure represented by the following formula (II):

(I)

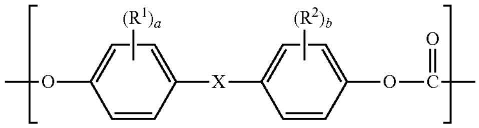

wherein in the formula (I), $R^1$ and $R^2$ each independently represent a halogen atom or a group selected from the group consisting of: an alkyl group having 1 to 18 carbon atoms; an alkoxy group having 1 to 18 carbon atoms; a cycloalkyl group having 6 to 20 carbon atoms; a cycloalkoxy group having 6 to 20 carbon atoms; an alkenyl group having 2 to 10 carbon atoms; an aryl group having 6 to 14 carbon atoms; an aryloxy group having 6 to 14 carbon atoms; an aralkyl group having 7 to 20 carbon atoms; an aralkyloxy group having 7 to 20 carbon atoms; a nitro group; an aldehyde group; a cyano group; and a carboxyl group, X represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, an aralkyl group having 7 to 20 carbon atoms, —S—, —SO—, —$SO_2$—, —O—, or —CO—, and “a” and “b” each independently represent an integer of from 0 to 4;

(II)

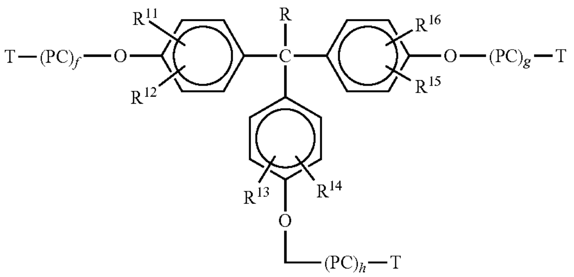

wherein in the formula (II), R represents a hydrogen atom or a group selected from the group consisting of: an alkyl group having 1 to 5 carbon atoms; a cycloalkyl group having 6 to 20 carbon atoms; a cycloalkoxy group having 6 to 20 carbon atoms; an alkenyl group having 2 to 10 carbon atoms; and an aryl group having 6 to 14 carbon atoms, $R^{11}$ to $R^{16}$ each independently represent a hydrogen atom, an alkyl group having 1 to 5 carbon atoms, or a halogen atom, PC represents a polycarbonate moiety, T represents a terminal group, and “f”, “g”, and “h” each represent an integer.

4. The polycarbonate-based resin composition according to claim 1, wherein the polycarbonate-based resin (A) has a viscosity-average molecular weight of 10,000 or more and 50,000 or less.

5. The polycarbonate-based resin composition according to claim 1, further comprising a release agent (D), wherein a content of the release agent (D) is 0.01 part by mass or more and 5.0 parts by mass or less with respect to 100 parts by mass of the polycarbonate-based resin (A).

6. The polycarbonate-based resin composition according to claim 1, further comprising a silicone compound (E), wherein a content of the silicone compound (E) is 0.01 part by mass or more and 5.0 parts by mass or less with respect to 100 parts by mass of the polycarbonate-based resin (A).

7. The polycarbonate-based resin composition according to claim 1, wherein the polycarbonate-based resin composition comprises a perfluoroalkane sulfonic acid metal salt and an aromatic ring-containing sulfonic acid metal salt at a total content of less than 0.05 part by mass with respect to 100 parts by mass of the polycarbonate-based resin (A).

8. The polycarbonate-based resin composition according to claim 1, wherein a 5-millimeter thick plate, which is obtained by subjecting the polycarbonate-based resin composition to injection molding under conditions of a cylinder temperature of 280° C., a mold temperature of 80° C., and a cycle time of 53 seconds, has a total light transmittance of 80% or more.

9. The polycarbonate-based resin composition according to claim 1, wherein a 5-millimeter thick plate, which is obtained by subjecting the polycarbonate-based resin composition to injection molding under conditions of a cylinder temperature of 280° C., a mold temperature of 80° C., and a cycle time of 53 seconds, has a haze of 4.0% or less.

10. The polycarbonate-based resin composition according to claim 1, wherein Previously Presented a 1.5-millimeter thick plate, which is obtained by subjecting the polycarbonate-based resin composition to injection molding under conditions of a cylinder temperature of 280° C., a mold temperature of 80° C., and a cycle time of 18 seconds, has a flame retardancy of V-0 under a UL94 standard.

11. The polycarbonate-based resin composition according to claim 1, wherein a 5-millimeter thick plate, which is obtained by subjecting the polycarbonate-based resin composition to injection molding under conditions of a cylinder temperature of 280° C., a mold temperature of 80° C., and a cycle time of 53 seconds, has a YI value of 6.0 or less.

12. A molded article, comprising the polycarbonate-based resin composition of claim 1.

13. The polycarbonate-based resin composition according to claim 1, wherein the antioxidant (C) consists of at least one antioxidant selected from the phosphorus-based antioxidant and the phenol-based antioxidant and the antioxidant (C) is the only antioxidant in the composition.

* * * * *